US012250532B2

(12) United States Patent
Vuine et al.

(10) Patent No.: US 12,250,532 B2
(45) Date of Patent: Mar. 11, 2025

(54) LOUDSPEAKER WITH INERTIAL EXCITER COMPRISING A MAGNET ASSEMBLY SUSPENDED FROM A MOUNTING FRAME

(71) Applicant: PSS BELGIUM NV, Dendermonde (BE)

(72) Inventors: Fabian Vuine, Dendermonde (BE); David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 209 days.

(21) Appl. No.: 18/001,357

(22) PCT Filed: May 19, 2021

(86) PCT No.: PCT/EP2021/063350
§ 371 (c)(1),
(2) Date: Dec. 9, 2022

(87) PCT Pub. No.: WO2021/254713
PCT Pub. Date: Dec. 23, 2021

(65) Prior Publication Data
US 2023/0247370 A1 Aug. 3, 2023

(30) Foreign Application Priority Data
Jun. 17, 2020 (GB) ...................................... 2009203

(51) Int. Cl.
*H04R 9/06* (2006.01)
*H04R 1/02* (2006.01)

(52) U.S. Cl.
CPC ............. *H04R 9/066* (2013.01); *H04R 1/025* (2013.01); *H04R 2400/07* (2013.01); *H04R 2400/11* (2013.01)

(58) Field of Classification Search
CPC ...... H04R 9/025; H04R 9/06; H04R 2499/11; H04R 1/288; H04R 1/025; H04R 9/066
(Continued)

(56) References Cited

U.S. PATENT DOCUMENTS 4,354,067 A 10/1982 Yamada et al.
4,506,117 A 3/1985 Fresard
(Continued)

FOREIGN PATENT DOCUMENTS

DE 102004009902 A1 2/2005
EP 0956736 B1 8/2005
(Continued)

OTHER PUBLICATIONS

ISA/EP, International Search Report and Written Opinion for corresponding PCT Patent Application No. PCT/EP2021/063350, mailed Aug. 25, 2021, 15 pages.

*Primary Examiner* — Disler Paul
(74) *Attorney, Agent, or Firm* — NK Patent Law

(57) ABSTRACT

A loudspeaker comprising: a mounting frame; an acoustic radiator; a drive unit. The drive unit includes: a magnet assembly including a magnet unit configured to provide a magnetic field in an air gap, wherein the air gap extends around a movement axis of the inertial exciter; a coil assembly, and a drive unit suspension. The coil assembly includes: an attachment portion which provides an attachment between the coil assembly and the acoustic radiator; a voice coil; a voice coil former which extends from the attachment portion into the air gap, wherein the voice coil is mounted to the voice coil former so the voice coil sits in the air gap when the drive unit is at rest; a tubular member, which is positioned radially outwardly of the voice coil
(Continued)

former with respect to the movement axis, and which overlaps the voice coil former along a portion of the movement axis.

20 Claims, 21 Drawing Sheets

(58) Field of Classification Search
USPC .................................. 381/332, 386, 398, 412
See application file for complete search history.

(56) References Cited

U.S. PATENT DOCUMENTS

| | | | | |
|---|---|---|---|---|
| 4,550,428 | A | 10/1985 | Yanagishima et al. | |
| 4,675,907 | A | 6/1987 | Itagaki et al. | |
| 4,750,208 | A | 6/1988 | Yamada et al. | |
| 5,734,132 | A | 3/1998 | Proni | |
| 6,618,487 | B1 | 9/2003 | Azima et al. | |
| 6,965,679 | B1 | 11/2005 | Lopez Bosio et al. | |
| 7,372,968 | B2 | 5/2008 | Buos et al. | |
| 8,247,930 | B2 | 8/2012 | Yamagishi | |
| 9,621,994 | B1 | 4/2017 | Bongiovi et al. | |
| 10,321,235 | B2 * | 6/2019 | Salvatti | H04R 9/06 |
| 10,911,875 | B2 * | 2/2021 | Wiik | H04R 9/06 |
| 11,388,523 | B2 * | 7/2022 | Corynen | H04R 9/043 |
| 11,696,059 | B2 * | 7/2023 | Han | H04R 1/04 381/174 |
| 11,930,342 | B2 * | 3/2024 | Liu | H04R 9/043 |
| 2003/0053651 | A1 | 3/2003 | Koura et al. | |
| 2004/0197007 | A1 | 10/2004 | Onuma | |
| 2005/0111690 | A1 | 5/2005 | Onuma et al. | |
| 2005/0180587 | A1 | 8/2005 | Lopez Bosio et al. | |
| 2005/0271239 | A1 | 12/2005 | Watanabe | |
| 2005/0271241 | A1 | 12/2005 | Watanabe | |
| 2006/0120554 | A1 | 6/2006 | Watanabe | |
| 2010/0054520 | A1 * | 3/2010 | Cobb | H04R 9/022 381/386 |
| 2017/0280223 | A1 | 9/2017 | Cavarra et al. | |
| 2023/0188898 | A1 * | 6/2023 | Pfeffer | H04R 9/063 381/398 |

FOREIGN PATENT DOCUMENTS

| | | | |
|---|---|---|---|
| EP | 2215852 | A1 | 8/2010 |
| JP | 2015130581 | A | 7/2015 |
| JP | 2016134836 | A | 7/2016 |
| WO | 2019121266 | A1 | 6/2019 |
| WO | 2019192808 | A1 | 10/2019 |
| WO | 2020126847 | A1 | 6/2020 |
| WO | 2021185777 | A1 | 9/2021 |
| WO | 2021249843 | A1 | 12/2021 |

* cited by examiner

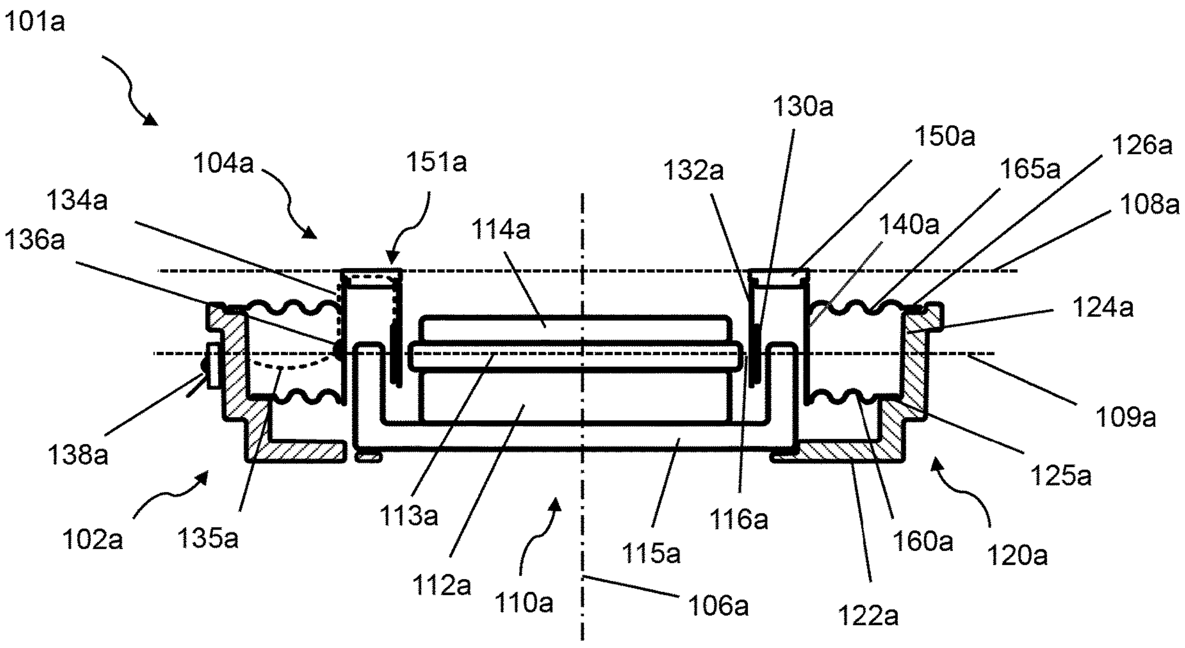
Fig. 4(a)(i)
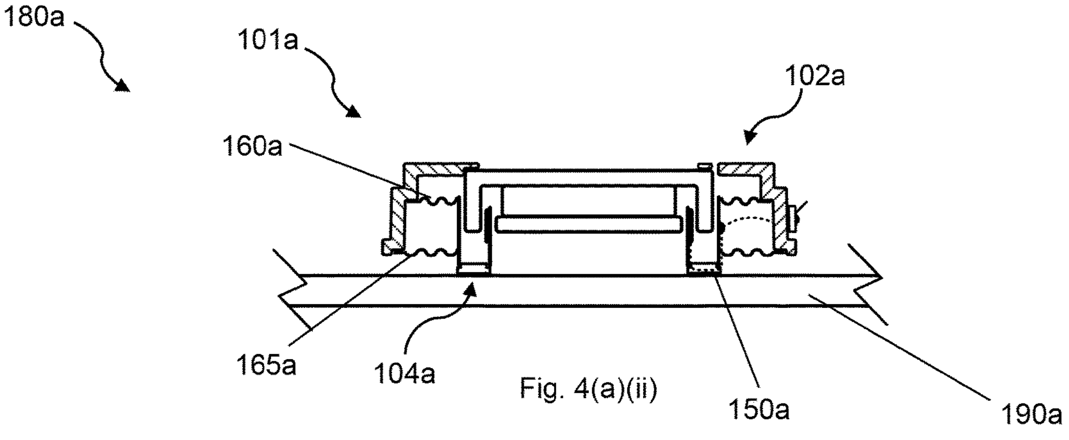
Fig. 4(a)(ii)
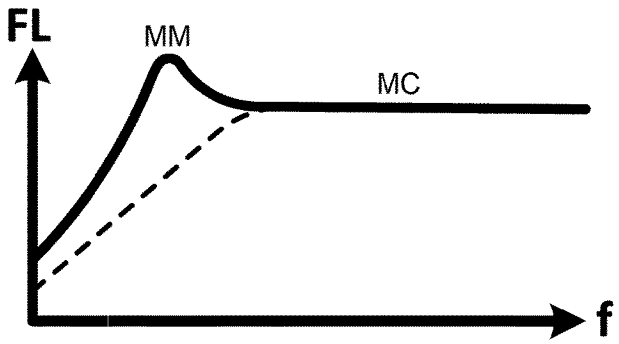
Fig. 4(a)(iii)

Fig. 4(a)(iv)

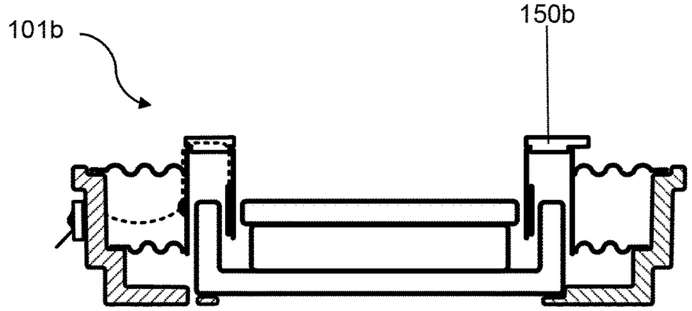
Fig. 4(b)(i)
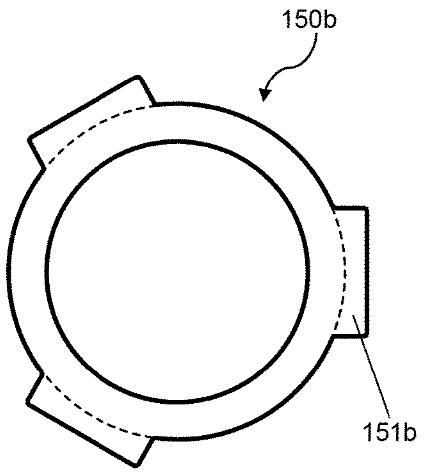
Fig. 4(b)(ii)
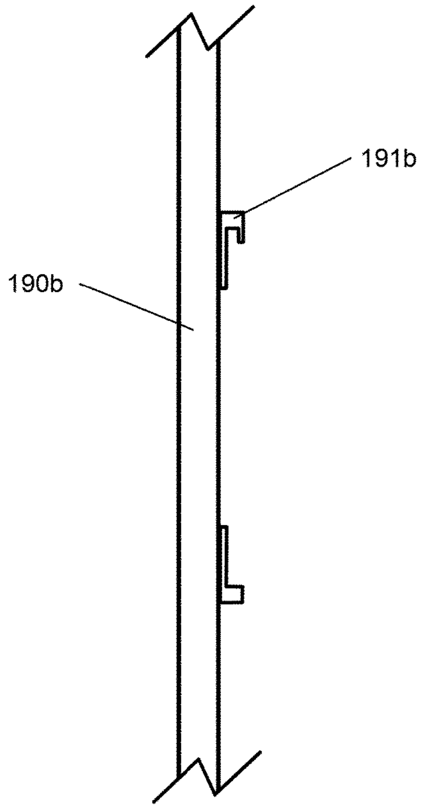
Fig. 4(b)(iii)
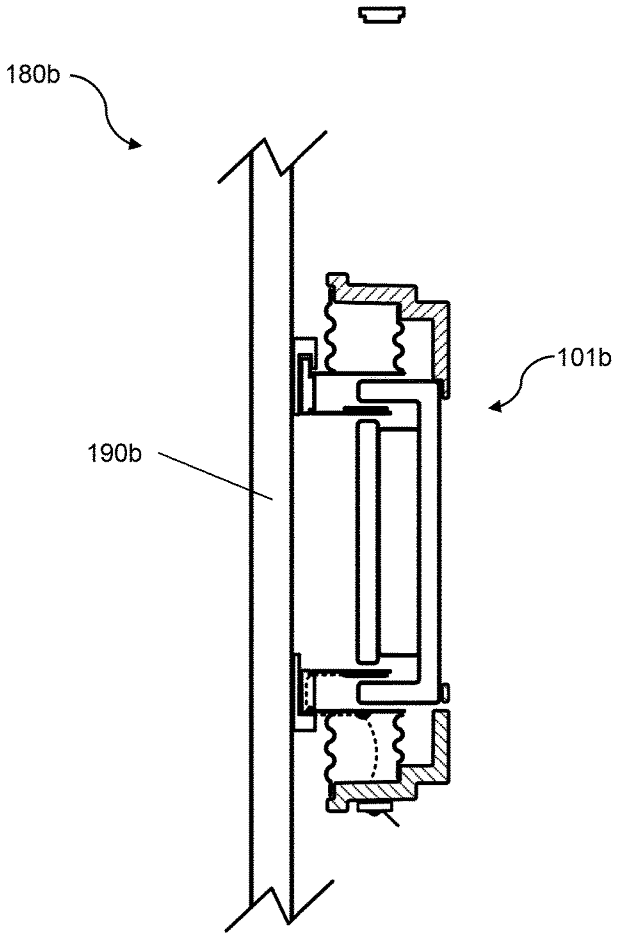
Fig. 4(b)(iv)

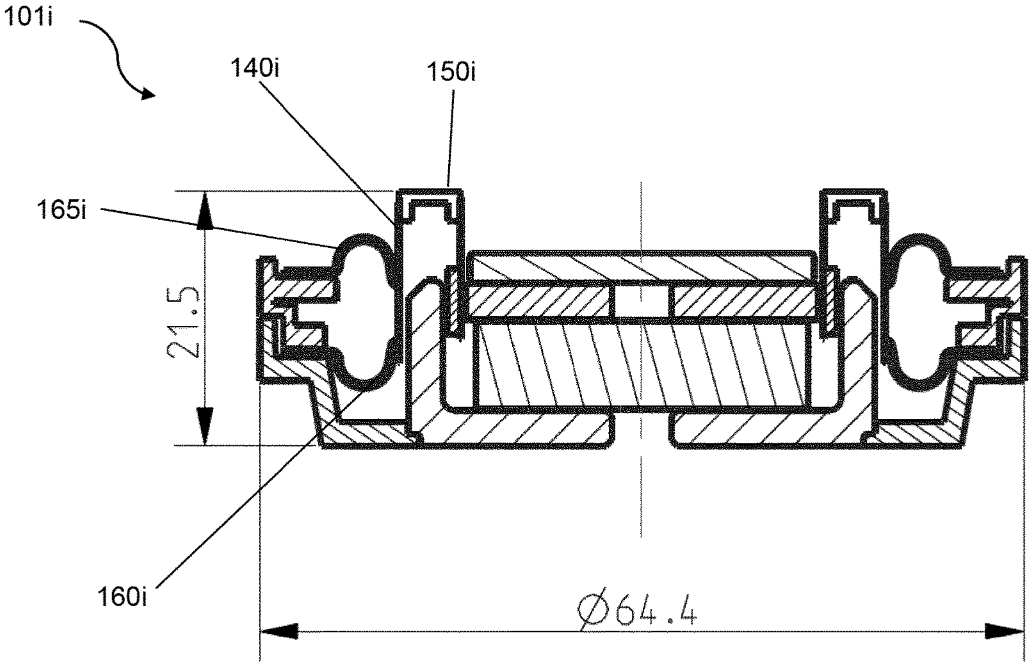
Fig. 4(i)(i)
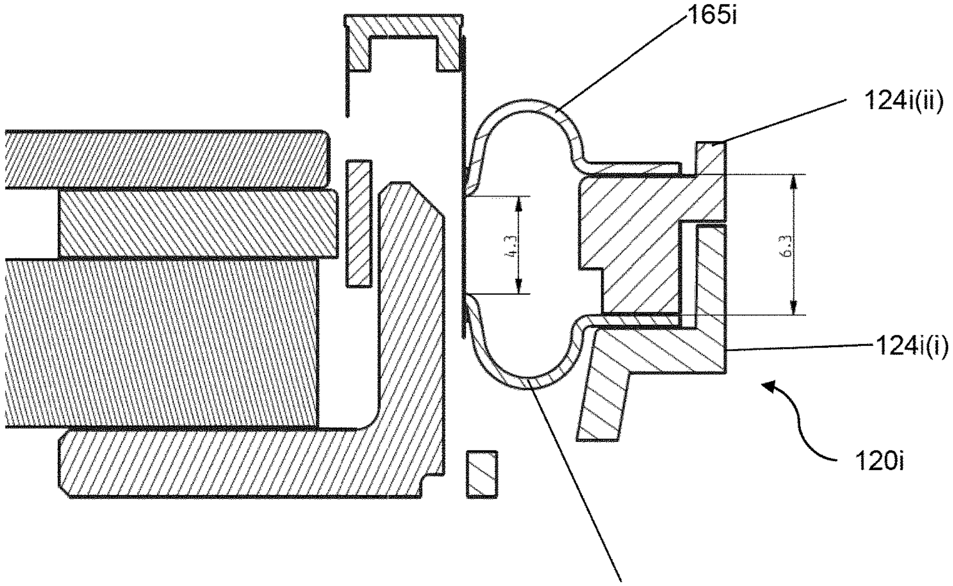
Fig. 4(i)(ii)

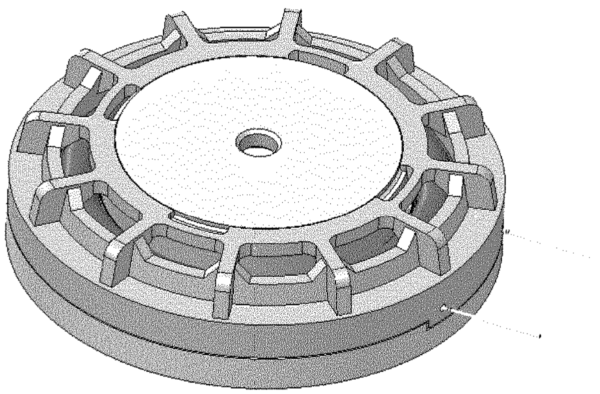
Fig. 4(i)(iii)
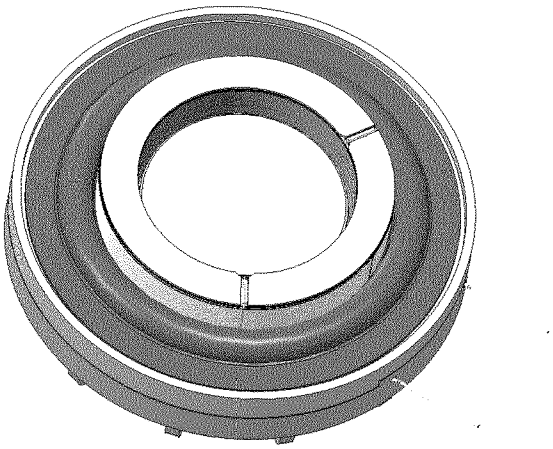
Fig.4(i)(iv)
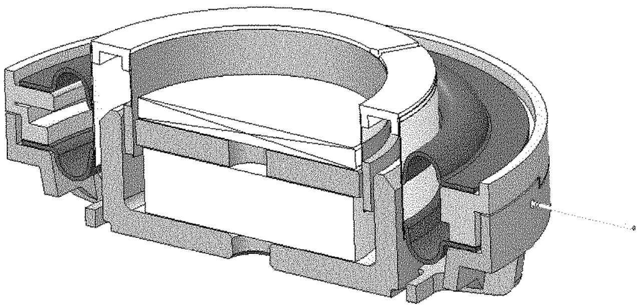
Fig.4(i)(v)
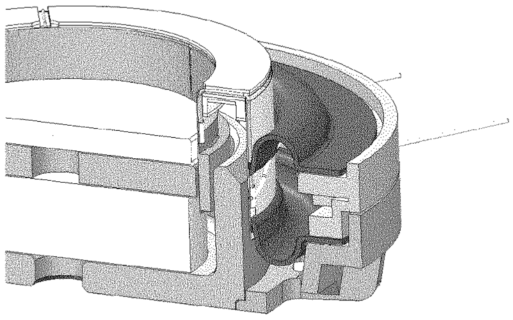
Fig. 4(i)(vi)
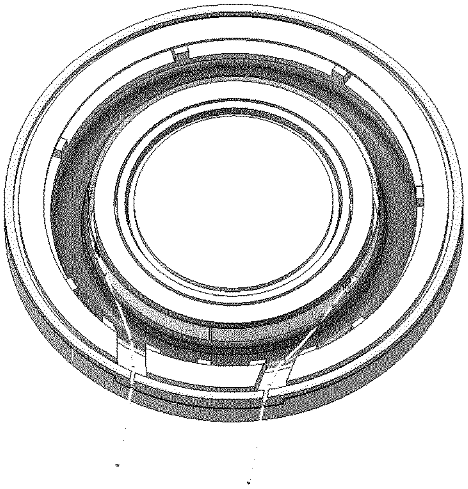
Fig. 4(i)(vii)
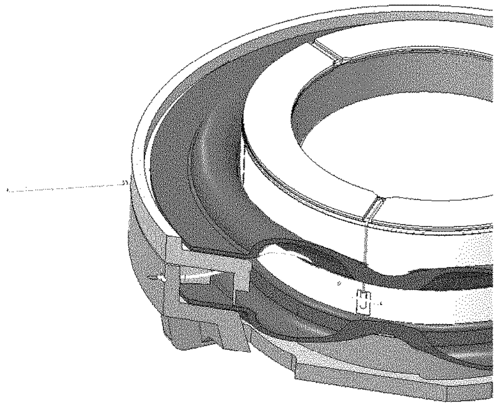
Fig.4(i)(viii)

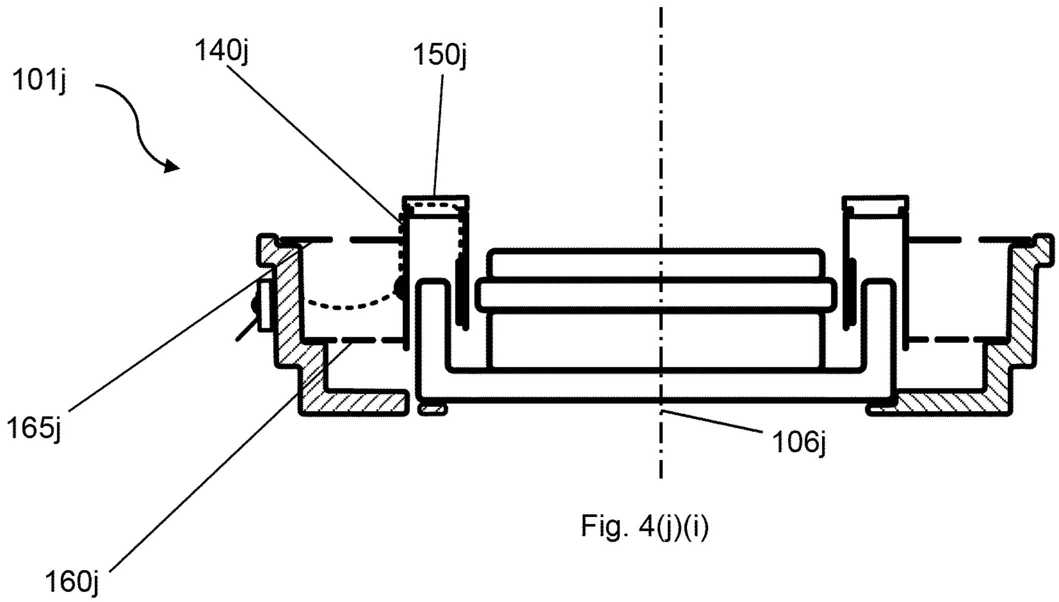
Fig. 4(j)(i)
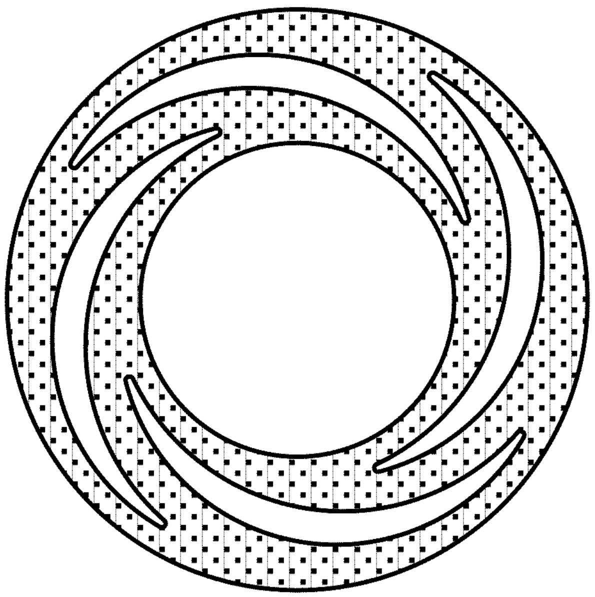
Fig. 4(j)(ii)

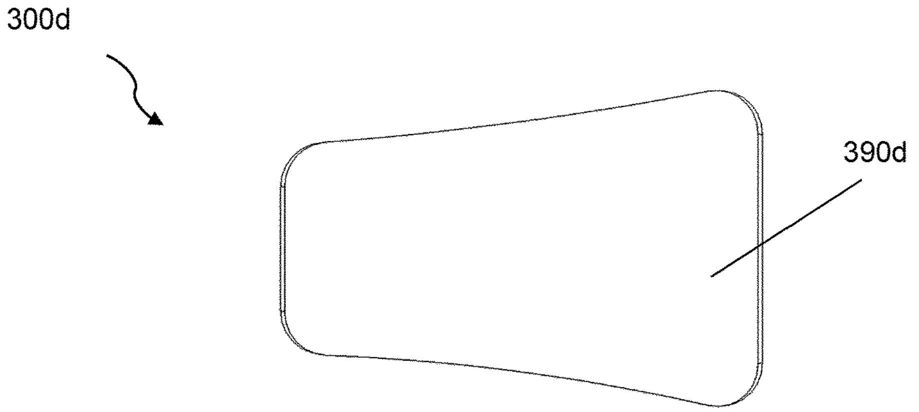
Fig. 6(d)(i)
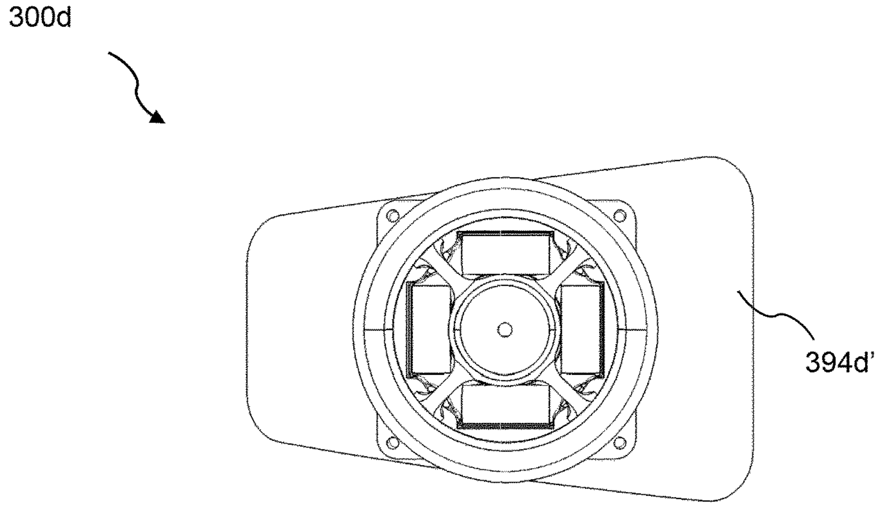
Fig. 6(d)(ii)
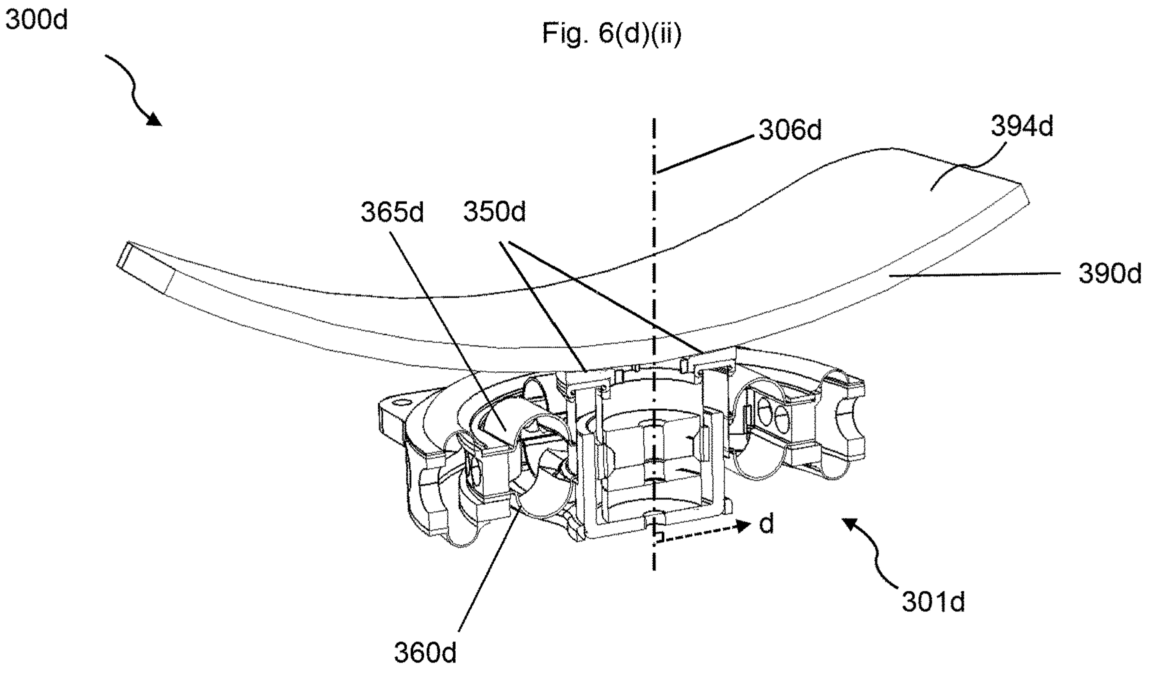
Fig. 6(d)(iii)

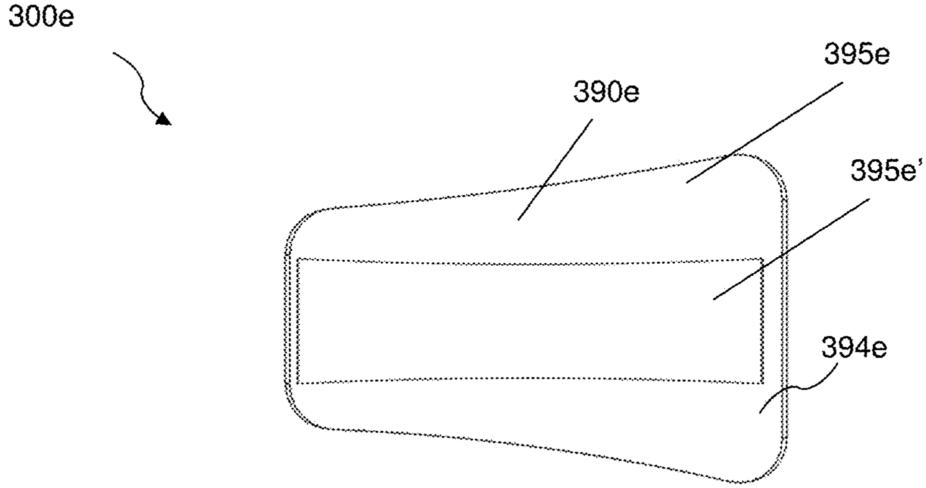
Fig. 6(e)(i)
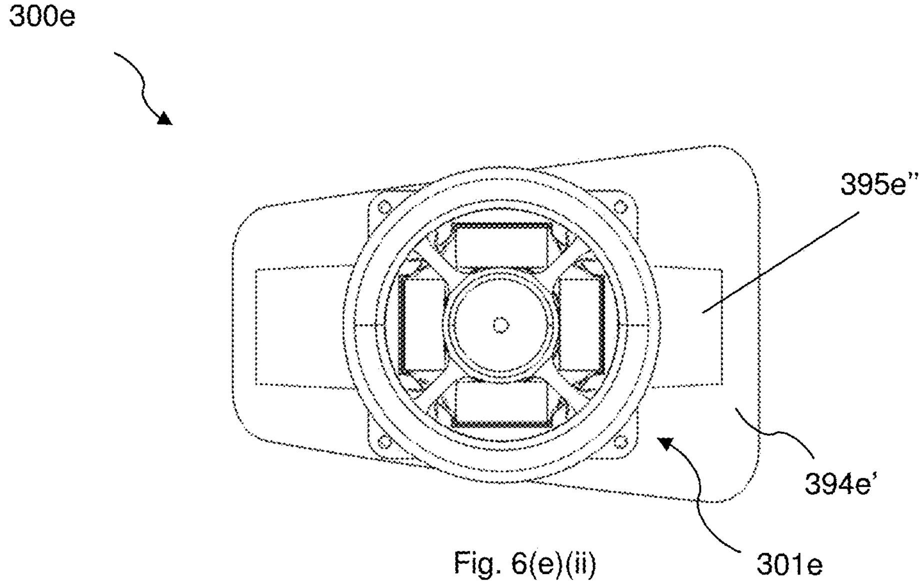
Fig. 6(e)(ii)

LOUDSPEAKER WITH INERTIAL EXCITER COMPRISING A MAGNET ASSEMBLY SUSPENDED FROM A MOUNTING FRAME

CROSS REFERENCE TO RELATED APPLICATIONS

This application is a U.S. National Stage Application of International Patent Application No. PCT/EP2021/063350 entitled "LOUDSPEAKER WITH INTERIAL EXCITER COMPRISING A MAGNET ASSEMBLY SUSPENDED FROM A MOUNTING FRAME", filed 19 May 2021, which claims priority to GB2009203.7 entitled "LOUDSPEAKER", filed 17 Jun. 2020, the entire contents and elements of all of which are herein incorporated by reference for all purposes.

FIELD OF THE INVENTION

The present invention relates to a loudspeaker which includes a drive unit. Corresponding methods are also disclosed.

BACKGROUND

Traditional loudspeakers, an example of which is shown in FIG. 1(*a*), typically include an acoustic radiator, typically referred to as a diaphragm, suspended from a magnet assembly including a frame mounted in a baffle or loudspeaker enclosure. Sound is produced as a result of movement of the diaphragm, actuated by a voice coil attached to the diaphragm, which interacts with a magnet unit which is part of the magnet assembly including the frame. The baffle or loudspeaker enclosure acts to inhibit cancellation between sound produced by the front and rear faces of the diaphragm.

Inertial exciters, an example of which is shown in FIG. 1(*b*), typically are devices in which a magnet assembly is configured to be suspended from an acoustic radiator such as a panel or soundboard, and which are configured to apply inertial force to the acoustic radiator so as to cause the acoustic radiator to vibrate to produce sound. Inertial exciters are typically used in automotive, aviation and consumer products.

Loudspeakers incorporating inertial exciters are well known, with examples being disclosed in, for example [1]-[12].

Inertial exciters are capable of transmitting a wide bandwidth of mechanical vibration energy into acoustic radiators, typically panels or walls that are configured to sustain that vibration energy across their surface to produce acoustic output. For a loudspeaker incorporating an inertial exciter, the frequency spectrum of interest (the frequency spectrum across which the loudspeaker is able to produce sound) may be the audible range (20 Hz-20 kHz).

In order to produce sound over a wide bandwidth, inertial exciters typically need to have a coil assembly (the part of the inertial exciter that includes the voice coil) that has a low mass and is very stiff so as to maximize the efficiency across the audio bandwidth. Whereas the magnet assembly (the part of the inertial exciter that includes the magnet system) can have a much higher mass (and generally will have a higher mass in practice).

The mechanical fixation of the inertial exciter to the acoustic panel requires special attention: when one wants to make use of moving coil (MC) excitation combined with moving magnet (MM) excitation (these types of excitation are discussed in more detail below), ideally the exciter is mounted to the acoustic radiator only via the coupler, i.e. with the magnet assembly being suspended from the acoustic radiator via the coil assembly, thereby leaving the magnet assembly freely suspended.

FIG. 2(*a*) shows a loudspeaker 1 incorporating a wide bandwidth inertial exciter implementing principles derived from the prior art. FIG. 2(*b*) is a graph showing force level vs frequency for the loudspeaker shown in FIG. 2(*a*).

In this example, a magnet assembly 2 including a magnet unit 10 and a frame 12 is suspended from an acoustic radiator 90 via a coil assembly including a voice coil 30 and a voice coil former 32. The voice coil 30 sits in an air gap 16 of the magnet unit 10 when the exciter 1 is at rest The voice coil will generate a force F according to:

$$F=BLI$$

where B is magnetic field, L is wire length and I is electric current (standard units).

The inertia of the magnet assembly 2 (which is typically significantly heavier than the voice coil assembly 4) allows the voice coil assembly 4 to transmit vibrational energy to the acoustic radiator 90. Excitation of the acoustic radiator 90 caused by movement of the voice coil assembly is referred to herein as "moving coil" or "MC" excitation.

Where the magnet assembly 2 is suspended from the acoustic radiator 90 via the coil assembly 4 (as in the example shown in FIG. 2(*a*)), resonance of the magnet assembly 2 is able to give additional vibrational energy to the acoustic radiator 90 around the resonant frequency of the magnet assembly 2. The resonant frequency of the magnet assembly 2 is defined by the mass of the magnet assembly 2 and the compliance of the suspension 60 from which the magnet assembly 2 is suspended. Excitation of the acoustic radiator 90 caused by resonance of the magnet assembly 2 is referred to herein as "moving magnet" or "MM" excitation.

As shown in FIG. 2(*b*), MM excitation provides a force boost at low frequencies (labelled "MM" in FIG. 2(*b*)), which is an advantage of systems in which the exciter is mounted to the acoustic radiator only via the coupler, as in the example of FIG. 2(*a*).

The force level provided by MC excitation (labelled "MC" in FIG. 2(*b*)) is boosted by the voice coil having a low weight and being very stiff.

The present inventors have observed a problem with the loudspeaker illustrated in FIG. 2(*a*). This problem is illustrated by FIG. 2(*c*).

In detail, when mounting the acoustic panel 90 (to which the wide bandwidth inertial exciter 1 is attached) vertically, e.g. in an interior door panel of a car, the gravitational force on the magnet assembly 2 tends to rotate its position relative to the voice coil 4 assembly over time. This is due to the compliance of the single suspension 60 (in this case a spider) that is configured to position the voice coil 30 in the air gap 16 (and does this job very well), but is not configured to inhibit rotation of the magnet assembly 2 relative to the voice coil assembly 4 when the acoustic radiator 90 is vertically mounted, e.g. as may be the case in a car door.

The prior art teaches some possible solutions to this problem, some of which are summarized as follows:

- Solution A as shown in FIG. 3(*a*)(*i*) and FIG. 3(*a*)(*ii*) ("Free magnet system")
  - Good MC & MM operation; Minimal additional mass for MC; Similar to [1];
  - Problem: Motor mass on single suspension makes it unstable regarding buckling as depicted in FIG. 2(*c*)

Solution B as shown in FIG. 3(*b*)(*i*) and FIG. 3(*b*)(*ii*) ("Grounded magnet system")

Stable magnet system; Similar to [13] and classic loudspeaker;

Problem: Large bracket for large panels, No MM excitation benefit, Not an inertial exciter design Solution C as shown in FIG. 3(*c*)(*i*) and FIG. 3(*c*)(*ii*) ("Bracket to panel")

Stable magnet system; Similar to [6], [7], [11], [12]

Problem: Influence of panel acoustics, No MM benefit

Solution D as shown in FIG. 3(*d*)(*i*) and FIG. 3(*d*)(*ii*) ("Centrally suspended motor")

MC and MM excitation; Reasonably stable; Similar to [4]

Problem: Additional mass for MC operation, Breakup of large coupler causes a step in force profile Solution E as shown in FIG. 3(*e*)(*i*) and FIG. 3(*e*)(*ii*) ("Double suspended motor")

MC and MM excitation; Stable motor suspension; Similar to [8], [9], [10]

Problem: Additional mass for MC operation, Breakup of large coupler causes a step in force profile Solution F as shown in FIG. 3(*f*)(*i*) and FIG. 3(*f*)(*ii*) ("Shaker")

Only MM operation (for use as a shaker); Stable motor suspension

Problem: Not a wide bandwidth

Solution F uses an inertial exciter as a shaker to transmit a small bandwidth of mechanical vibration energy into structures such as a seat in a car or in a cinema to augment the experience via tactile stimulus. Generally, the frequency spectrum in which this seems enjoyable is very limited, e.g. 30 Hz-80 Hz. The design of shakers is less complicated as compared to acoustic exciters because they rely solely on the inertial vibration energy of the moving magnet system (MM) since their scope is to transfer only low frequency vibration. The fixation of such shaker to the panel is also less critical and may involve heavier constructions without compromising performance. Of course a wide bandwidth inertial exciter (with a freely suspended magnet system as in solutions A, D, E) can also be used solely as a shaker.

The present inventors have observed that it is difficult to make an inertial exciter that successfully inhibits rotation of the magnet assembly relative to the voice coil assembly whilst allowing MM excitation and without adding significant weight to the voice coil assembly. Thus, it is difficult to produce an inertial exciter having good sound reproduction over a wideband bandwidth, without encountering rotation issues when the acoustic radiator is mounted vertically, e.g. as might be the case in a car door.

A dipole loudspeaker for producing sound at bass frequencies is disclosed in [14]. In some examples, the frame from which the diaphragm is suspended is a first frame, wherein the diaphragm is suspended from the first frame via one or more primary suspensions, and wherein the first frame is suspended from a second frame via one or more secondary suspensions. This arrangement may be useful to reduce vibrations passing from the loudspeaker into the environment.

The present inventors have observed that it is desirable to provide a small drive unit able to provide stable pistonic movement of an acoustic radiator without having problems caused by rocking of the acoustic radiator when the loudspeaker is in use The present invention has been devised in light of the above considerations.

SUMMARY OF THE INVENTION

A first aspect of the invention provides:

A loudspeaker comprising:

a mounting frame;

an acoustic radiator;

a drive unit, including:

- a magnet assembly including a magnet unit configured to provide a magnetic field in an air gap, wherein the air gap extends around a movement axis of the inertial exciter;
- a coil assembly including:
  - an attachment portion which provides an attachment between the coil assembly and the acoustic radiator;
  - a voice coil;
  - a voice coil former which extends from the attachment portion into the air gap, wherein the voice coil is mounted to the voice coil former so that the voice coil sits in the air gap when the drive unit is at rest;
  - a tubular member, which is positioned radially outwardly of the voice coil former with respect to the movement axis, and which overlaps the voice coil former along at least a portion of the movement axis;

at least one drive unit suspension attached to the tubular member and a part of the magnet assembly positioned radially outwardly of the tubular member so that the acoustic radiator is suspended from the magnet assembly via the coil assembly by the at least one drive unit suspension;

wherein the magnet unit assembly is suspended from the mounting frame by at least one mounting frame suspension.

In the context of this application, the term "mounting frame" is intended only to distinguish a frame from which the magnet unit assembly is suspended (by at least one mounting frame suspension) from other frames disclosed herein (e.g. a "magnet assembly frame" as described below).

In the context of this application, the terms "drive unit" in "drive unit suspension" and "mounting frame" in "mounting frame suspension" is intended only to distinguish between a suspension used to suspend the acoustic radiator from the magnet assembly (a "drive unit suspension") and a suspension used to suspend the magnet unit assembly from the mounting frame (a "mounting frame suspension").

The tubular member, by being positioned radially outwardly of the voice coil former (preferably also of the air gap) with respect to the movement axis, facilitates the attachment of the at least one drive unit suspension, preferably two drive unit suspensions, to the part of the magnet assembly positioned radially outwardly of the tubular member.

This is advantageous because it helps to provide stable pistonic movement of the acoustic radiator and reduces rocking of the acoustic radiator when the loudspeaker is in use.

By having the magnet unit assembly suspended from the mounting frame, vibrations passing from the loudspeaker into the environment can be reduced, e.g. in an analogous manner to that described in [14].

The movement axis may be defined as an axis along which the voice coil assembly is configured to move relative to the magnet assembly when the drive unit is activated by supplying electrical current carrying an audio signal to the voice coil.

The drive unit may be considered to be at rest when electrical current is not supplied to the voice coil.

Note that in order for the acoustic radiator to be suspended from the magnet assembly via the coil assembly, the magnet assembly should only be attached to the acoustic radiator via the coil assembly, i.e. with no rigid attachment between the magnet assembly and the acoustic radiator.

Preferably, the drive unit comprises:

- a first drive unit suspension attached to the tubular member and the part of the magnet assembly positioned radially outwardly of the tubular member; and
- a second drive unit suspension, separated from the first drive unit suspension in a direction extending parallel to the movement axis, wherein the second drive unit suspension is either: attached to the tubular member and the part of the magnet assembly positioned radially outwardly of the tubular member or is attached to the voice coil former and a part of the magnet assembly positioned radially inwardly of the voice coil former.

The use of two drive unit suspensions, separated in the direction of the movement axis, helps to significantly reduce the rotation described above with respect to FIG. 2(*c*) and maintain good performance without substantially increasing the weight of the coil assembly, noting that the tubular member allows a large separation of the first and second drive unit suspensions, and also noting that the tubular member has an inherently stiff shape and so can be formed from lightweight material.

For a typical application, the distance between locations at which the two drive unit suspensions attach to the part of the magnet assembly positioned radially outwardly of the tubular member may be at least 3 mm, more preferably at least 5 mm, more preferably at least 6 mm as measured in a direction extending parallel to the movement axis. A skilled person would appreciate that actual distances will vary in practice depending on various factors including weight of the magnet assembly (larger weight requires larger distance) and design limitations (e.g. space in aperture in which loudspeaker is to be installed).

The magnet assembly may include a magnet assembly frame to which the magnet unit is attached, wherein the part of the magnet assembly positioned radially outwardly of the tubular member (to which the at least one drive unit suspension is attached) is a part of the magnet assembly frame.

The part of the magnet assembly positioned radially outwardly of the tubular member (to which the at least one drive unit suspension is attached) could, for example, be a rim of the magnet assembly frame.

The part of the magnet assembly positioned radially outwardly of the tubular member (to which the at least one drive unit suspension is attached) may include a respective ledge for the/each drive unit suspension attached to the part of the magnet assembly positioned radially outwardly of the tubular member, thereby facilitating attachment of the drive unit suspension(s) to the part of the magnet assembly positioned radially outwardly of the tubular member.

The magnet assembly frame (included in the magnet assembly) may include apertures configured to allow a jig to be inserted to centre the tubular member during assembly.

Some optional features of the drive unit described herein are described with reference to:

- a first plane perpendicular to the movement axis which extends through the attachment portion;
- a second plane perpendicular to the movement axis which extends through the air gap.

Features described with reference to the first and second planes are preferably described with respect to the drive unit when the drive unit is at rest. As noted above, the drive unit may be considered to be at rest when electrical current is not supplied to the voice coil.

The part of the magnet assembly positioned radially outwardly of the tubular member (to which the at least one drive unit suspension is attached) may include:

- a proximal portion, wherein the proximal portion of the part of the magnet assembly positioned radially outwardly of the tubular member is located between the first plane and the second plane; and
- a distal portion, wherein the distal portion of the part of the magnet unit positioned radially outwardly of the tubular member is located is on an opposite side of the second plane from the proximal portion (of the part of the magnet assembly positioned radially outwardly of the tubular member).

The magnet assembly may include a part of the magnet assembly positioned radially inwardly of the voice coil former, wherein the part of the magnet assembly position radially inwardly of the voice coil former includes:

- a proximal portion, wherein the proximal portion of the part of the magnet assembly positioned radially inwardly of the voice coil former is located between the first plane and the second plane; and
- a distal portion, wherein the distal portion of the part of the magnet unit positioned radially inwardly of the voice coil former is located is on an opposite side of the second plane from the proximal portion (of the part of the magnet assembly positioned radially inwardly of the voice coil former).

The part of the magnet assembly positioned radially inwardly of the voice coil former may include part of the magnet unit. The proximal portion of the part of the magnet assembly positioned radially inwardly of the voice coil former may for example include part of the magnet unit, e.g. an extra magnet 114*a* as shown in FIG. 4(*a*)(*i*). The distal portion of the part of the magnet assembly positioned radially inwardly of the voice coil former may for example include part of the magnet unit, e.g. a main magnet 112*a* as shown in FIG. 4(*a*)(*i*).

The tubular member may include:

- a proximal portion, wherein the proximal portion of the tubular member is located between the first plane and the second plane;
- a distal portion, wherein the distal portion of the tubular member is located is on an opposite side of the second plane from the proximal portion (of the tubular member).

The voice coil former may include:

- a proximal portion, wherein the proximal portion of the voice coil former is located between the first plane and the second plane;
- a distal portion, wherein the distal portion of the voice coil former is located on an opposite side of the second plane from the proximal portion (of the voice coil former).

Note that if the tubular member has the distal portion (as described above), this allows the tubular member to reach past the air gap on the outside of the magnet unit, and allows the first and second drive unit suspensions to be separated by a larger distance, compared with an arrangement in which the two drive unit suspensions are attached to the voice coil former.

Preferably, the first drive unit suspension is attached to the distal portion of the tubular member and the distal portion of the part of the magnet assembly positioned radially outwardly of the tubular member.

Preferably, the second drive unit suspension is attached to the proximal portion of the tubular member and the proximal portion of the part of the magnet assembly positioned radially outwardly of the tubular member.

However, the second drive unit suspension could potentially instead attach to the proximal portion of the voice coil former and the proximal portion of the part of the magnet assembly positioned radially inwardly of the voice coil former, whilst still allowing a wide separation between the first and second drive unit suspensions, thereby still helping to reduce the rotation discussed above with reference to FIG. 2(*c*).

Preferably, the drive unit comprises both:

- a first drive unit suspension that is attached to the distal portion of the tubular member and the distal portion of the part of the magnet assembly positioned radially outwardly of the tubular member; and
- a second drive unit suspension that is attached to the proximal portion of the tubular member and the proximal portion of the part of the magnet assembly positioned radially outwardly of the tubular member.

This arrangement allows the first and second drive unit suspensions to have a particularly large space between them, which helps to reduce the rotation discussed above with reference to FIG. 2(*c*).

In this arrangement, the drive unit may optionally include a third drive unit suspension that is attached to the proximal portion of the voice coil former and the proximal portion of the part of the magnet assembly positioned radially inwardly of the voice coil former (e.g. as shown in FIG. 5(*b*)).

The tubular member preferably extends around the magnet unit.

The tubular member preferably overlaps the magnet unit along at least a portion of the movement axis.

The tubular member may be shaped to include the attachment portion, e.g. so as to facilitate direct gluing (or some other attachment) of the tubular member to the acoustic radiator.

The tubular member may be shaped to include the attachment portion and the voice coil former.

The tubular member may include or be attached to a surface extending outwardly in a radial direction (with respect to the movement axis) from the distal portion of the tubular member to provide a surface for attaching the tubular member to the first drive unit suspension. The surface may be flat. The surface may be provided by a ring, e.g. made of plastic/cardboard.

The tubular member may include or be attached to a surface extending outwardly in a radial direction (with respect to the movement axis) from the proximal portion of the tubular member to provide a surface for attaching the tubular member to the second drive unit suspension. The surface may be flat. The surface may be provided by a ring, e.g. made of plastic/cardboard.

The wall of the tubular member could form an angle with respect to the movement axis, e.g. so that the distal portion of the tubular member is further from the movement axis than the proximal portion of the tubular member, thereby forming a frusto-conical tubular member. In this case, the angle is preferably no more than 15°.

The tubular member could have one or more extensions in radially outward direction (with respect to the movement axis) to provide a respective attachment surface for the/each drive unit suspension attached to the tubular member, thereby facilitating attachment of the/each drive unit suspension to the tubular member.

The width of the drive unit in the radial direction (perpendicular to the movement axis) will generally depend on design requirements.

The drive unit may include one or more wires configured to provide an electrical path for supplying an electrical current carrying an audio signal (representative of sound) to the voice coil.

The electrical path provided by the one or more wires may extend from a connector formed on the magnet assembly (e.g. on a frame of the magnet assembly) to the voice coil.

The one or more wires may include wire from the voice coil winding and/or a lead wire which connects to the voice coil winding.

The one or more wires may include a wire that passes through or around the tubular member. A coupling element (if present—see below) may be configured to guide said wire through or around the tubular member.

The one or more wires may include a wire that passes through or around (preferably through) a frame included in the magnet assembly.

The one or more wires may include two wires that meet at an electrical junction formed on an outwardly facing surface of the tubular member, e.g. at a solderpad or glue dot on the outwardly facing surface of the tubular member.

The magnet unit is preferably configured to provide a magnetic field in an air gap. The voice coil former and/or the tubular member may be cylindrical. But other shapes of air gap, voice coil former and tubular member are possible, e.g. oval, square.

Preferably the voice coil former is arranged around the movement axis.

The voice coil former preferably extends from the attachment portion in a direction which extends along the movement axis into the air gap.

The tubular member and voice coil former are each preferably made from lightweight materials such as paper, cardboard, Kapton, aluminium, kevlar, PE, ABS etc.

The tubular member and voice coil former are preferably made of the same material as each other, but could be made of different materials.

The tubular member and voice coil former may be formed integrally with each other (preferably also the attachment portion).

Preferably the attachment portion is arranged around the movement axis.

The attachment portion may be configured to provide an attachment between the coil assembly and the acoustic radiator by including a gluing surface configured to be glued to the acoustic radiator.

The attachment portion may be configured to provide an attachment between the coil assembly and the acoustic radiator by including bayonet features (e.g. projections) configured to engage with corresponding bayonet features (e.g. slots) on the acoustic radiator to provide a bayonet attachment between the attachment portion and the acoustic radiator.

The attachment portion may be a coupling element which is separately attached to the voice coil former and/or tubular member, e.g. by glue.

The coupling element could be a ring-shaped element, e.g. a cardboard or plastic ring.

The coupling element is not an essential element of the invention, since the attachment portion could be formed integrally with the voice coil former and/or the tubular member. Or the voice coil and tubular member could be configured to attach independently (e.g. by glue) to the acoustic radiator, in which case the attachment portion could include the glue and part of the acoustic radiator.

The/each drive unit suspension could take various forms.

Preferably, the/each drive unit suspension includes one or more corrugations. A drive unit suspension including one corrugation is preferred in some examples.

The at least one drive unit suspension may include a spider. The/each drive unit suspension may be a spider.

The at least one drive unit suspension may include a roll drive unit suspension. The/each drive unit suspension may be a roll drive unit suspension.

The at least one drive unit suspension may include a piece of sheet material having a geometry configured to allow deflection in a direction parallel to the movement axis, whilst inhibiting movement in a direction perpendicular to the movement axis. The/each drive unit suspension may be a piece of sheet material having a geometry configured to allow deflection in a direction parallel to the movement axis, whilst inhibiting movement in a direction perpendicular to the movement axis.

A potential advantage of a sheet material drive unit suspension could be a reduced height (in the movement axis direction) compared with classic drive unit suspensions which typically require a corrugation to facilitate deflection in the movement axis direction.

If there are two drive unit suspensions, each drive unit suspension including one or more corrugations, then the one or more corrugations in one drive unit suspension may mirror the one or more corrugations in the other spider, e.g. with respect to a plane perpendicular to the movement axis, e.g. to help cancel asymmetries in stiffness.

The magnet unit may include a central main magnet and a U-yoke.

In use, electrical current carrying an audio signal may be supplied to the voice coil which energises the voice coil and causes a magnetic field to be produced by the current in the voice coil, which interacts with the magnetic field produced in the air gap by the magnet unit, and causes the voice coil assembly to move relative to the magnet assembly. This relative movement is accommodated by the at least one drive unit suspension.

A second aspect of the invention provides:

A loudspeaker comprising:

a mounting frame;

an acoustic radiator;

a drive unit, including:

- a magnet assembly including a magnet unit configured to provide a magnetic field in an air gap, wherein the air gap extends around a movement axis of the exciter;
- a coil assembly including:
  - an attachment portion which provides an attachment between the coil assembly and the acoustic radiator;
  - a voice coil;
  - a voice coil former which extends from the attachment portion into the air gap, wherein the voice coil is mounted to the voice coil former so that the voice coil sits in the air gap when the drive unit is at rest;
  - a tubular member, which is positioned radially inwardly of the voice coil former with respect to the movement axis, and which overlaps the voice coil former along at least a portion of the movement axis;
- at least one drive unit suspension attached to the tubular member and a part of the magnet assembly positioned radially inwardly of the tubular member so that the acoustic radiator is suspended from the magnet assembly via the coil assembly by the at least one drive unit suspension;

wherein the magnet unit assembly is suspended from the mounting frame by at least one mounting frame suspension.

The loudspeaker provided by the second aspect of the invention is similar to that provided by the first aspect of the invention, and provides essentially the same benefits as the loudspeaker provided by the first aspect of the invention, but with the components arranged in a different order in the radial direction with respect to the movement axis.

The loudspeaker provided by the second aspect of the invention permits use of a ring-shaped magnet, allow more magnet material to be used compared with the inner magnet type examples, and therefore enable more powerful drive units (and thus loudspeakers), as may be desirable in some cases.

A loudspeaker according to the second aspect of the invention may thus incorporate any one or more features described in connection with loudspeaker according to the first aspect of the invention, but with the ordering and direction of certain elements in the drive unit being altered in the radial direction (with respect to the movement axis) in order to provide equivalent benefits. Similarly, definitions described above with respect to the first aspect of the invention may be used in connection with the first aspect of the invention.

Some example features of loudspeaker according to the second aspect of the invention will now be described.

The movement axis may be defined as an axis along which the voice coil assembly is configured to move relative to the magnet assembly when the drive unit is activated by supplying electrical current carrying an audio signal to the voice coil.

The drive unit may be considered to be at rest when electrical current is not supplied to the voice coil.

Note that in order for the acoustic radiator to be suspended from the magnet assembly via the coil assembly, the magnet assembly should only be attached to the acoustic radiator via the coil assembly, i.e. with no rigid attachment between the magnet assembly and the acoustic radiator.

Preferably, the drive unit comprises:

- a first drive unit suspension attached to the tubular member and the part of the magnet assembly positioned radially inwardly of the tubular member; and
- a second drive unit suspension, separated from the first drive unit suspension in a direction extending parallel to the movement axis, wherein the second drive unit suspension is either: attached to the tubular member and the part of the magnet assembly positioned radially inwardly of the tubular member or is attached to the voice coil former and a part of the magnet assembly positioned radially outwardly of the voice coil former.

For a typical application, the distance between locations at which the two drive unit suspensions attach to the part of the magnet assembly positioned radially inwardly of the tubular member may be at least 3 mm, more preferably at least 5 mm, more preferably at least 6 mm as measured in a direction extending parallel to the movement axis. A skilled person would appreciate that actual distances will vary in practice depending on various factors including weight of the magnet assembly (larger weight requires larger distance) and design limitations (e.g. space in aperture in which loudspeaker is to be installed).

The magnet assembly may include a magnet assembly frame to which the magnet unit is attached, wherein the part of the magnet assembly positioned radially inwardly of the tubular member (to which the at least one drive unit suspension is attached) is a part of the magnet assembly frame.

The part of the magnet assembly positioned radially inwardly of the tubular member (to which the at least one drive unit suspension is attached) could, for example, be a hub of the magnet assembly frame.

The part of the magnet assembly positioned radially inwardly of the tubular member (to which the at least one drive unit suspension is attached) may include a respective ledge for the/each drive unit suspension attached to the part of the magnet assembly positioned radially inwardly of the tubular member, thereby facilitating attachment of the drive unit suspension(s) to the part of the magnet assembly positioned radially inwardly of the tubular member.

The magnet assembly frame (included in the magnet assembly) may include apertures configured to allow a jig to be inserted to centre the tubular member during assembly.

Some optional features of the drive unit described herein are described with reference to:

- a first plane perpendicular to the movement axis which extends through the attachment portion;
- a second plane perpendicular to the movement axis which extends through the air gap.

Features described with reference to the first and second planes are preferably described with respect to the drive unit when the drive unit is at rest. As noted above, the drive unit may be considered to be at rest when electrical current is not supplied to the voice coil.

The part of the magnet assembly positioned radially inwardly of the tubular member (to which the at least one drive unit suspension is attached) may include:

- a proximal portion, wherein the proximal portion of the part of the magnet assembly positioned radially inwardly of the tubular member is located between the first plane and the second plane; and
- a distal portion, wherein the distal portion of the part of the magnet unit positioned radially inwardly of the tubular member is located is on an opposite side of the second plane from the proximal portion (of the part of the magnet assembly positioned radially inwardly of the tubular member).

The magnet assembly may include a part of the magnet assembly positioned radially outwardly of the voice coil former, wherein the part of the magnet assembly position radially outwardly of the voice coil former includes:

- a proximal portion, wherein the proximal portion of the part of the magnet assembly positioned radially outwardly of the voice coil former is located between the first plane and the second plane; and
- a distal portion, wherein the distal portion of the part of the magnet unit positioned radially outwardly of the voice coil former is located is on an opposite side of the second plane from the proximal portion (of the part of the magnet assembly positioned radially outwardly of the voice coil former).

The part of the magnet assembly positioned radially outwardly of the voice coil former may include part of the magnet unit. The proximal portion of the part of the magnet assembly positioned radially outwardly of the voice coil former may for example include part of the magnet unit, e.g. a washer 213*a* as shown in FIG. 5(*a*). The distal portion of the part of the magnet assembly positioned radially outwardly of the voice coil former may for example include part of the magnet unit, e.g. a main magnet 212*a* as shown in FIG. 5(*a*).

The tubular member may include:

- a proximal portion, wherein the proximal portion of the tubular member is located between the first plane and the second plane;
- a distal portion, wherein the distal portion of the tubular member is located is on an opposite side of the second plane from the proximal portion (of the tubular member).

The voice coil former may include:

- a proximal portion, wherein the proximal portion of the voice coil former is located between the first plane and the second plane;
- a distal portion, wherein the distal portion of the voice coil former is located is on an opposite side of the second plane from the proximal portion (of the voice coil former).

Note that if the tubular member has the distal portion (as described above), this allows the tubular member to reach past the air gap on the inside of the magnet unit, and allows the first and second drive unit suspensions to be separated by a larger distance, compared with an arrangement in which the two drive unit suspensions are attached to the voice coil former.

Preferably, the first drive unit suspension is attached to the distal portion of the tubular member and the distal portion of the part of the magnet assembly positioned radially inwardly of the tubular member.

Preferably, the second drive unit suspension is attached to the proximal portion of the tubular member and the proximal portion of the part of the magnet assembly positioned radially inwardly of the tubular member.

However, the second drive unit suspension could potentially instead attach to the proximal portion of the voice coil former and the proximal portion of the part of the magnet assembly positioned radially outwardly of the voice coil former (e.g. as shown in FIG. 5(*c*)), whilst still allowing a wide separation between the first and second drive unit suspensions, thereby still helping to reduce the rotation discussed above with reference to FIG. 2(*c*).

Preferably, the drive unit comprises both:

- a first drive unit suspension that is attached to the distal portion of the tubular member and the distal portion of the part of the magnet assembly positioned radially inwardly of the tubular member; and
- a second drive unit suspension that is attached to the proximal portion of the tubular member and the proximal portion of the part of the magnet assembly positioned radially inwardly of the tubular member.

This arrangement allows the first and second drive unit suspensions to have a particularly large space between them, which helps to reduce the rotation discussed above with reference to FIG. 2(*c*).

In this arrangement, the drive unit may optionally include a third drive unit suspension that is attached to the proximal portion of the voice coil former and the proximal portion of the part of the magnet assembly positioned radially outwardly of the voice coil former (e.g. as shown in FIG. 5(*b*)).

The magnet unit preferably extends around the tubular member.

The tubular member preferably overlaps the magnet unit along at least a portion of the movement axis.

The tubular member may be shaped to include the attachment portion, e.g. so as to facilitate direct gluing (or some other attachment) of the tubular member to the acoustic radiator.

The tubular member may be shaped to include the attachment portion and the voice coil former.

The tubular member may include or be attached to a surface extending inwardly in a radial direction (with respect to the movement axis) from the distal portion of the tubular member to provide a surface for attaching the tubular member to the first drive unit suspension. The surface may be flat. The surface may be provided by a ring, e.g. made of plastic/cardboard.

The tubular member may include or be attached to a surface extending inwardly in a radial direction (with respect to the movement axis) from the proximal portion of the tubular member to provide a surface for attaching the tubular member to the second drive unit suspension. The surface may be flat. The surface may be provided by a ring, e.g. made of plastic/cardboard.

The wall of the tubular member could form an angle with respect to the movement axis, e.g. so that the distal portion of the tubular member is closer to the movement axis that the proximal portion of the tubular member, thereby forming a frusto-conical tubular member. In this case, the angle is preferably no more than 15°.

The tubular member could have one or more extensions in radially inward direction (with respect to the movement axis) to provide a respective attachment surface for the/each drive unit suspension attached to the tubular member, thereby facilitating attachment of the/each drive unit suspension to the tubular member.

The width of the drive unit in the radial direction (perpendicular to the movement axis) will generally depend on design requirements.

The drive unit may include one or more wires configured to provide an electrical path for supplying an electrical current carrying an audio signal (representative of sound) to the voice coil.

The electrical path provided by the one or more wires may extend from a connector formed on the magnet assembly (e.g. on a frame of the magnet assembly) to the voice coil.

The one or more wires may include wire from the voice coil winding and/or a lead wire which connects to the voice coil winding.

The one or more wires may include a wire that passes through or around the tubular member. A coupling element (if present—see below) may be configured to guide said wire through or around the tubular member.

The one or more wires may include a wire that passes through or around (preferably through) a frame included in the magnet assembly.

The one or more wires may include two wires that meet at an electrical junction formed on an inwardly facing surface of the tubular member, e.g. at a solderpad or glue dot on the inwardly facing surface of the tubular member.

The magnet unit is preferably configured to provide a magnetic field in an air gap. The voice coil former and/or the tubular member may be cylindrical. But other shapes of air gap, voice coil former and tubular member are possible, e.g. oval, square.

Preferably the voice coil former is arranged around the movement axis.

The voice coil former preferably extends from the attachment portion in a direction which extends along the movement axis into the air gap.

The tubular member and voice coil former are each preferably made from lightweight materials such as paper, cardboard, Kapton, aluminium, kevlar, PE, ABS etc.

The tubular member and voice coil former are preferably made of the same material as each other, but could be made of different materials.

The tubular member and voice coil former may be formed integrally with each other (preferably also the attachment portion).

Preferably the attachment portion is arranged around the movement axis.

The attachment portion may be configured to provide an attachment between the coil assembly and the acoustic radiator by including a gluing surface configured to be glued to the acoustic radiator.

The attachment portion may be configured to provide an attachment between the coil assembly and the acoustic radiator by including bayonet features configured to engage with corresponding bayonet features on the acoustic radiator to provide a bayonet attachment between the attachment portion and the acoustic radiator.

The attachment portion may be a coupling element which is separately attached to the voice coil former and/or tubular member, e.g. by glue.

The coupling element could be a ring-shaped element, e.g. a cardboard or plastic ring.

The coupling element is not an essential element of the invention, since the attachment portion could be formed integrally with the voice coil former and/or the tubular member. Or the voice coil and tubular member could be configured to attach independently (e.g. by glue) to the acoustic radiator, in which case the attachment portion could include the glue and part of the acoustic radiator.

The/each drive unit suspension could take various forms. Preferably, the/each drive unit suspension includes one or more corrugations. A drive unit suspension including one corrugation, e.g. a roll drive unit suspension, is preferred in some examples.

The at least one drive unit suspension may include a spider. The/each drive unit suspension may be a spider.

The at least one drive unit suspension may include a roll drive unit suspension. The/each drive unit suspension may be a roll drive unit suspension.

The at least one drive unit suspension may include a piece of sheet material having a geometry configured to allow deflection in a direction parallel to the movement axis, whilst inhibiting movement in a direction perpendicular to the movement axis. The/each drive unit suspension may be a piece of sheet material having a geometry configured to allow deflection in a direction parallel to the movement axis, whilst inhibiting movement in a direction perpendicular to the movement axis.

A potential advantage of a sheet material drive unit suspension could be a reduced height (in the movement axis direction) compared with classic drive unit suspensions which typically require a corrugation to facilitate deflection in the movement axis direction.

If there are two drive unit suspensions, each drive unit suspension including one or more corrugations, then the one or more corrugations in one drive unit suspension may mirror the one or more corrugations in the other spider, e.g. with respect to a plane perpendicular to the movement axis, e.g. to help cancel asymmetries in stiffness.

The magnet unit may include a ring-shaped main magnet and a T-yoke.

In use, electrical current carrying an audio signal is supplied to the voice coil which energises the voice coil and causes a magnetic field to be produced by the current in the voice coil, which interacts with the magnetic field produced in the air gap by the magnet unit, and causes the voice coil assembly to move relative to the magnet assembly. This relative movement is accommodated by the at least one drive unit suspension.

We shall now describe a number of features that may be applied to either/both of a loudspeaker according to the first aspect of the invention, or a loudspeaker according to the second aspect of the invention:

The acoustic radiator could have various shapes (e.g. flat, curved, small, large, geometric, free-form).

The loudspeaker may be configured as a dipole loudspeaker. A loudspeaker according to the first or second aspect of the invention is particularly well suited for use as a dipole loudspeaker because its construction is such that it can obstruct a small area of the radiating surface of the acoustic radiator to which it is attached (often referred to as the "second radiating surface" herein).

The mounting frame may be part of, or may be configured to fixedly attach to, a rigid supporting structure, such as a car seat frame.

The at least one mounting frame suspension may be tuned to have a resonance frequency that is below a frequency spectrum over which the loudspeaker is configured to operate, e.g. so as to limit the force on a supporting structure. The at least one mounting frame suspension may be tuned to have a resonance frequency that is 20 Hz or lower, more preferably a resonance frequency in the range 10 Hz to 20 Hz. Note that if there is more than one mounting frame suspension (e.g. two roll suspensions, as in the example of FIG. 6(*a*)) then it is the resulting stiffness of all mounting frame suspensions that (together with the mass of the drive unit and acoustic radiator) which define the resonance frequency.

The one or more mounting frame suspensions may be tuned to have a resonance frequency that is lower than a resonance frequency that the one or more drive unit suspensions are tuned to have.

The mounting frame may include a rigid body which extends around the movement axis. The rigid body is preferably located radially outwards from the magnet unit, relative to the movement axis.

In some examples, the loudspeaker may include a mounting frame suspension and a drive unit suspension that are both part of a single piece of material (which may be an elastic material, in some examples).

In some examples, the loudspeaker may include:

a first mounting frame suspension and a first drive unit suspension that are both part of a first piece of material (which may be an elastic material, in some examples); and a second mounting frame suspension and a second drive unit suspension that are both part of a second piece of material (which may be an elastic material, in some examples).

Having two suspensions which are part of a same piece of material helps facilitate manufacture of the loudspeaker.

In some examples, the at least one mounting frame suspension may include one or more roll suspensions, preferably at least two roll suspensions.

The material used for a roll suspension does not need to be elastic (e.g. it can be a textile). This is because a roll suspension allows for axial movement because it has excess material in its roll that can "roll off" during excursion. However, because of this excess material, a single roll suspension will not generally provide an adequate level of axial stability against rocking, whereas with two roll suspensions it can.

In some examples, the at least one mounting frame suspension may be formed of an elastic material, preferably a single piece of elastic material. The elastic material may be a single piece of elastic foam.

When a single piece of elastic material is used, we rely on its elasticity to provide the compliance of the suspension. So, if it wants to rock it has to stretch the elastic material. The elastic material should be chosen according to design requirements. Experimentation shows that a single piece of elastic foam works well for a wide range of purposes.

Preferably, the acoustic radiator has a width in at least one direction perpendicular to the movement axis that is larger than a width of the drive unit in the same direction. This means, for example, that the acoustic radiator should have a width in at least one direction perpendicular to the movement axis that is larger than a width of the drive unit (including the magnet assembly and the coil assembly) in that direction. The at least one direction may include two orthogonal directions.

In other words, preferably the acoustic radiator extends beyond the sides of the drive unit in at least one direction perpendicular to the movement axis.

By having the diaphragm extend beyond the contours of the drive unit in at least one direction perpendicular to the movement axis, one can maximize the diaphragm's surface area within a given headrest application. This is especially meaningful if the loudspeaker is configured to move the diaphragm at bass frequencies and is configured to be used as a dipole loudspeaker for cocooning purposes, e.g. as described in [14], where a radiating surface of 100 $cm^2$ or more may be beneficial.

More generally, having the diaphragm extend beyond the contours of the drive unit allows the loudspeaker to better approximate a perfect dipole.

In some examples, the acoustic radiator may have, in at least one direction perpendicular to the movement axis, a width that is at least 1.5 times (possibly even 2 times) the width of the drive unit in the same direction. In a headrest implementation (e.g. as discussed in [14]), this may allow the acoustic radiator to have a geometry which follows the contour of the headrest, which may help bring the diaphragm closer to the ear of a user.

Preferably, the attachment portion is attached to the acoustic radiator at multiple locations on the acoustic radiator, wherein a centre of mass of the acoustic radiator is located between two of the locations at which the attachment portion is attached to the acoustic radiator.

In some examples, the acoustic radiator may have a laminate structure formed of at least two layers. The at least two layers may include a first layer of a first material having a first density (mass per unit volume), and a second layer of a second material having a second density, wherein the first density is lower than the second density.

In this way, the (denser, and therefore heavier) second layer can provide additional stiffness to the first layer.

In some examples, the acoustic radiator may have a laminate structure formed of at least three layers. The at least three layers may include a first layer of a first material having a first density (mass per unit volume), wherein the first layer is sandwiched between a second layer of a second material having a second density, and a third layer of a third material having a third density, wherein the first density is lower than both the second density and third density.

In this way, the (denser, and therefore heavier) second and third layers can provide additional stiffness to the first layer.

The third material may be the same as the second material, e.g. as in the example shown in FIGS. 6(*e*)(*i*) and 6(*e*)(*ii*) below.

The second layer may only partially cover a face of the first layer to which the second layer is attached, e.g. so that only the minimum amount of (denser, and therefore heavier) second material is used in order for the acoustic radiator to have a desired stiffness. This may help to optimize the weight of the acoustic radiator within a desired pistonic frequency range (e.g. up to 200 Hz before a first break-up mode occurs).

For example, the second layer may cover 75% or less of the surface area of the face of the first layer to which the second layer is attached, preferably 50% or less of the surface area of the face of the first layer to which the second layer is attached.

The third layer (if present) may only partially cover a face of the first layer to which the third layer is attached, e.g. so that only the minimum amount of (denser, and therefore heavier) third material is used in order for the acoustic radiator to have a desired stiffness. This may help to optimize the weight of the acoustic radiator within a desired pistonic frequency range (e.g. up to 200 Hz before a first break-up mode occurs).

For example, the third layer may cover 75% or less of the surface area of the face of the first layer to which the third layer is attached, preferably 50% or less of the surface area of the face of the first layer to which the third layer is attached.

Preferably, the first material includes (preferably is) polystyrene and the second material includes (preferably is) balsa. Preferably, the third material (if present) includes (preferably is) balsa.

The acoustic radiator may have:

a first radiating surface which faces in a forward direction, away from the drive unit; and a second radiating surface which faces in a backward direction, toward the drive unit.

The coil assembly of the drive unit may be attached to the second radiating surface of the acoustic radiator (via the attachment portion).

The acoustic radiator may be curved so that the first radiating surface is concave and so that its second radiating surface is convex. Again, this may allow the acoustic radiator to have a geometry which follows the contour of the headrest, which may help bring the diaphragm closer to the ear of a user.

The acoustic radiator may have, at its periphery (e.g. outer edge), an extension which extends along the movement axis in the backward direction. As described in more detail below, this can help maximize the acoustic output and minimize blowing noises in a gap between the acoustic radiator and a surrounding waveguide.

The/each drive unit suspension may each extend in a linear direction in a plane perpendicular to the movement axis, e.g. for increased linearity of movement, for silent operation and/or for avoiding trapped air that can make blowing noises.

The drive unit may be configured to move the diaphragm at bass frequencies such that the first and second radiating surfaces produce sound at bass frequencies, wherein the sound produced by the first radiating surface is in antiphase with sound produced by the second radiating surface.

The bass frequencies at which the drive unit is configured to move the diaphragm preferably includes frequencies across the range 60-80 Hz, more preferably a frequencies across the range 50-100 Hz, more preferably a frequencies across the range 40-100 Hz, and may include frequencies across the range 40-160 Hz. At these frequencies, the present inventor has found that the loudspeaker is able to produce a particularly useful personal sound cocoon, for reasons discussed in detail in [14].

Moving the diaphragm at frequencies below 40 Hz may be useful for some applications, but not for others (such as in a car, where below 40 Hz background noise tends to be too loud).

The loudspeaker may be configured as a subwoofer.

In some examples, the first and second radiating surfaces may each have a surface area of at least 100 $cm^2$, e.g. for reasons as described in [14].

Preferably, a frame of the magnet assembly (e.g. "magnet assembly frame" as discussed above) and the mounting frame overlap at one or more locations as viewed in a plane perpendicular to the movement axis. Preferably, a frame of the magnet assembly (e.g. "magnet assembly frame" as discussed above) and the mounting frame overlap at two or more locations as viewed in a plane perpendicular to the movement axis, e.g. in a series of locations which are (continuously or discontinuously) located along a path (e.g. a circular path) which extends around the movement axis. Such overlaps can provide crash protection, e.g. as described below with reference to FIG. 6(*f*).

The loudspeaker may be configured to be mounted within a headrest of a seat, e.g. by including one or more mounting formations configured to facilitate mounting of the loudspeaker within the headrest.

In a third aspect, the present invention may provide a seat assembly including a seat and a loudspeaker according to the first aspect or second aspect of the present invention.

Preferably, the seat is configured to position a user who is sat down in the seat such that at least one ear of the user is located at a listening position (preferably each ear of a user is located at a respective listening position) that is 40 cm or less (more preferably 30 cm or less, more preferably 25 cm or less, more preferably 20 cm or less, more preferably 15 cm or less) from the first radiating surface of the loudspeaker.

The loudspeaker may be mounted within a headrest of the seat ("seat headrest"). Since a typical headrest is configured to be a small distance (e.g. 30 cm or less) from the ear(s) of a user who is sat down in a seat, this is a particularly convenient way of configuring the seat to position a user who is sat down in the seat such that an ear of the user is located at a listening position that is a small distance (e.g. 30 cm or less) from the first radiating surface of the loudspeaker.

A seat headrest typically has a front surface configured to face towards the head of a user sat in the seat, and a back surface configured to face away from the head of a user sat in the seat. The loudspeaker is preferably mounted within the headrest of the seat e.g. with the first radiating surface of the loudspeaker facing the front surface of the headrest, e.g. with a principal axis of the first radiating surface extending out through the front surface of the headrest.

The loudspeaker may be configured as a dipole loudspeaker, e.g. the loudspeaker may be mounted in the seat headrest so that the seat headrest is configured to allow sound produced by the first radiating surface of the acoustic radiator to propagate out through the front surface of the headrest and to allow sound produced by a second radiating surface of the acoustic radiator to propagate out from the back surface of the headrest.

The seat may have a rigid seat frame.

The mounting frame of the loudspeaker may be part of or fixedly attached to the rigid seat frame.

The seat (e.g. part of a seat headrest in which the loudspeaker is mounted) may include a waveguide which at least partially (preferably entirely) surrounds the acoustic radiator and is configured to guide sound produced by the first and/or second radiating surface of the acoustic radiator.

Preferably, a gap between the waveguide and a periphery of the acoustic radiator is less than 5 mm, more preferably less than 2 mm (e.g. in the range 1 mm to 2 mm), at one or more (preferably all) locations at the periphery (e.g. edge) of the acoustic radiator.

The seat may be a vehicle seat, for use in a vehicle such as a car ("car seat") or an aeroplane ("plane seat").

The seat could be a seat for use outside of a vehicle. For example, the seat could be a seat for a computer game player, a seat for use in studio monitoring or home entertainment.

In a fourth aspect, the present invention may provide a vehicle (e.g. a car or an aeroplane) having a plurality of seat assemblies according to the third aspect of the invention.

A fifth aspect of the invention provides:

A method of manufacturing a loudspeaker according to the first or second aspect of the invention.

The method may include pre-assembling the coil assembly, before suspending the magnet assembly from the coil assembly by the at least one drive unit suspension.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 1(*b*) shows an example inertial exciter.

FIG. 2(*b*) is a graph showing force level vs frequency for the loudspeaker shown in FIG. 2(*a*).

FIG. 2(*c*) illustrates a problem with the inertial exciter shown in FIG. 2(*a*).

FIG. 3(*b*)(*i*) and (*ii*) illustrate "Solution B" as taught by the prior art.

FIG. 3(*c*)(*i*) and (*ii*) illustrate "Solution C" as taught by the prior art.

FIG. 3(*d*)(*i*) and (*ii*) illustrate "Solution D" as taught by the prior art.

FIG. 3(*e*)(*i*) and (*ii*) illustrate "Solution E" as taught by the prior art.

FIG. 3(*f*)(*i*) and (*ii*) illustrate "Solution F" as taught by the prior art.

FIG. 4(*b*)(*i*)-(*iv*) show a second drive unit 101*b* that exemplifies an inertial exciter of the inner magnet type, and a loudspeaker 180*b* incorporating the first drive unit 101*b*.

FIG. 4(*c*) shows a third drive unit 101*c* that exemplifies a drive unit of the inner magnet type.

FIG. 4(*d*) shows a fourth drive unit 101*d* that exemplifies a drive unit of the inner magnet type.

FIG. 4(*e*) shows a fifth drive unit 101*e* that exemplifies a drive unit of the inner magnet type.

FIG. 4(*f*) shows a sixth drive unit 101*f* that exemplifies a drive unit of the inner magnet type.

FIG. 4(*g*) shows a seventh drive unit 101*g* that exemplifies a drive unit of the inner magnet type.

FIG. 4(*h*) shows an eighth drive unit 101*h* that exemplifies a drive unit of the inner magnet type.

FIG. 4(*i*)(*i*)-(*viii*) shows a ninth drive unit 101*i* that exemplifies a drive unit of the inner magnet type.

FIG. 4(*j*)(*i*)-(*ii*) show a tenth drive unit 101*j* that exemplifies a drive unit of the inner magnet type.

FIG. 4(*k*) shows an eleventh drive unit 101*k* that exemplifies a drive unit of the inner magnet type.

FIG. 4(*l*) shows a twelfth drive unit 101*l* that exemplifies a drive unit of the inner magnet type.

FIG. 5(*b*) shows a second drive unit 201*b* that exemplifies a drive unit of the outer magnet type.

FIG. 5(*c*) shows a third drive unit 201*c* that exemplifies a drive unit of the outer magnet type.

FIG. 5(*d*) shows a fourth drive unit 201*d* that exemplifies a drive unit of the outer magnet type.

FIG. 6(*b*) shows a second example loudspeaker.

FIG. 6(*c*) shows a third example loudspeaker.

FIGS. 6(*d*)(*i*)-(*iii*) shows a fourth example loudspeaker.

FIGS. 6(*e*)(*i*)-(*ii*) shows a fifth example loudspeaker.

FIG. 6(*f*) shows a sixth example loudspeaker.

FIG. 6(*g*) shows a seventh example loudspeaker.

FIG. 6(*h*) shows an eighth example loudspeaker.

FIG. 6(*i*) shows a seat headrest incorporating ninth and tenth example loudspeakers.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

For the purpose of this description, example drive units are divided into two types, referred to as "inner magnet" type according to the first aspect of the invention and "outer magnet" type according to the second aspect of the invention.

Drive Unit—Inner Magnet Type Examples

Figure 1A:
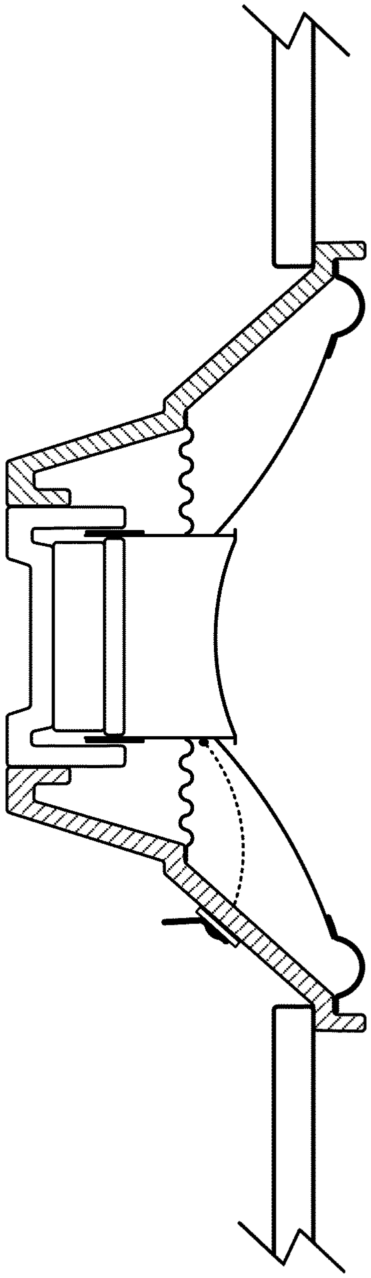
FIG. 1(*a*) shows an example traditional loudspeaker.
Figure 1B:
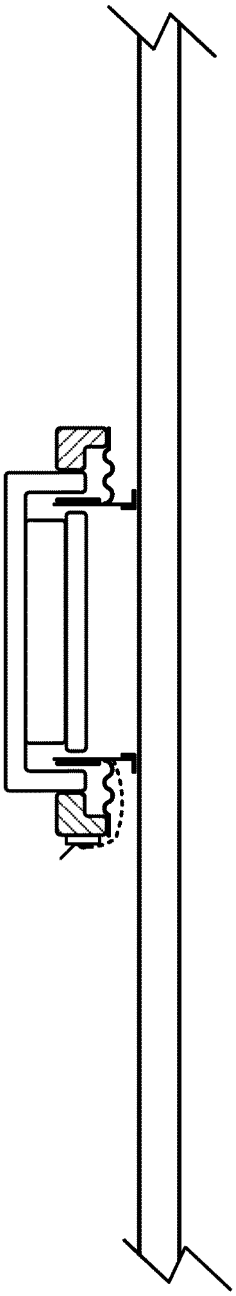
Figure 2A:
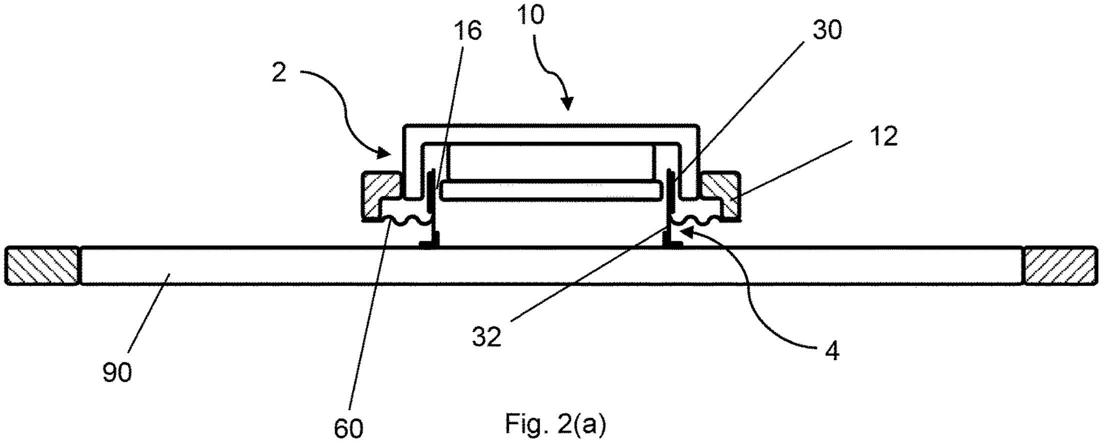
FIG. 2(*a*) shows a loudspeaker incorporating a wide bandwidth inertial exciter implementing principles derived from the prior art.
Figure 2B:
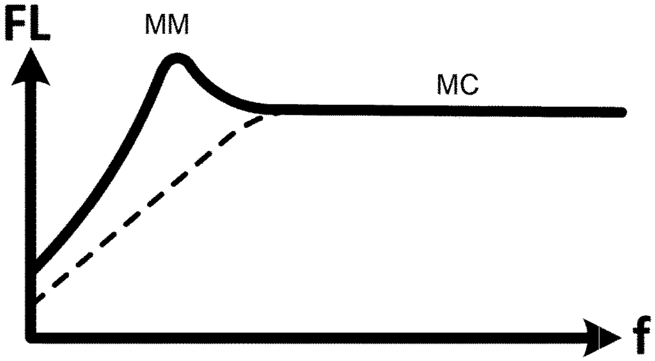
Figure 2C:
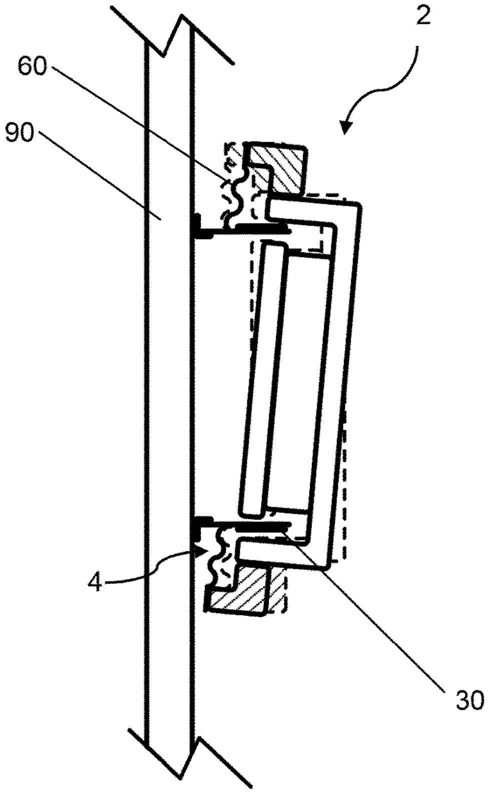
Figure 3:
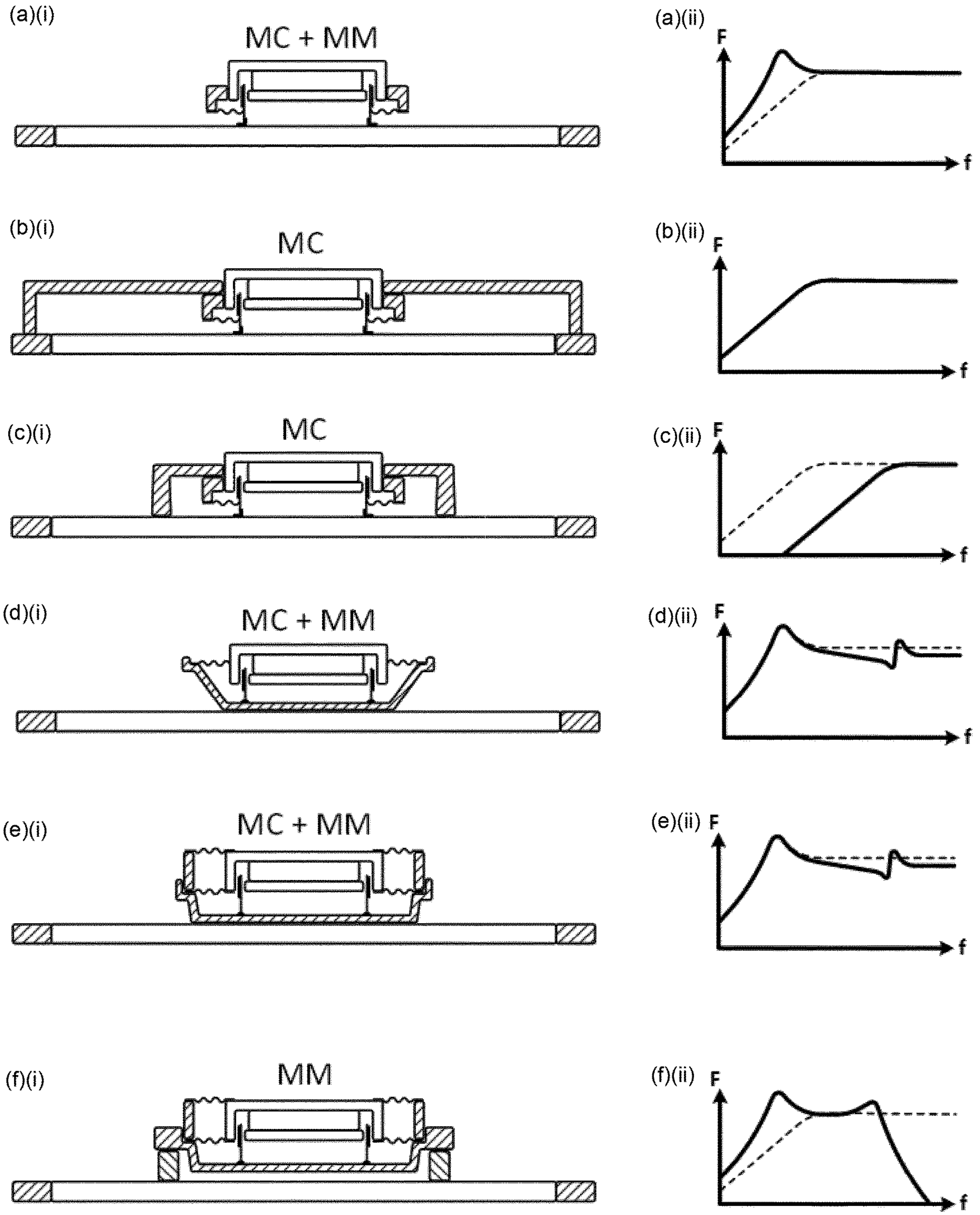
FIG. 3(*a*)(*i*) and (*ii*) illustrate "Solution A" as taught by the prior art.
Figure 4A:
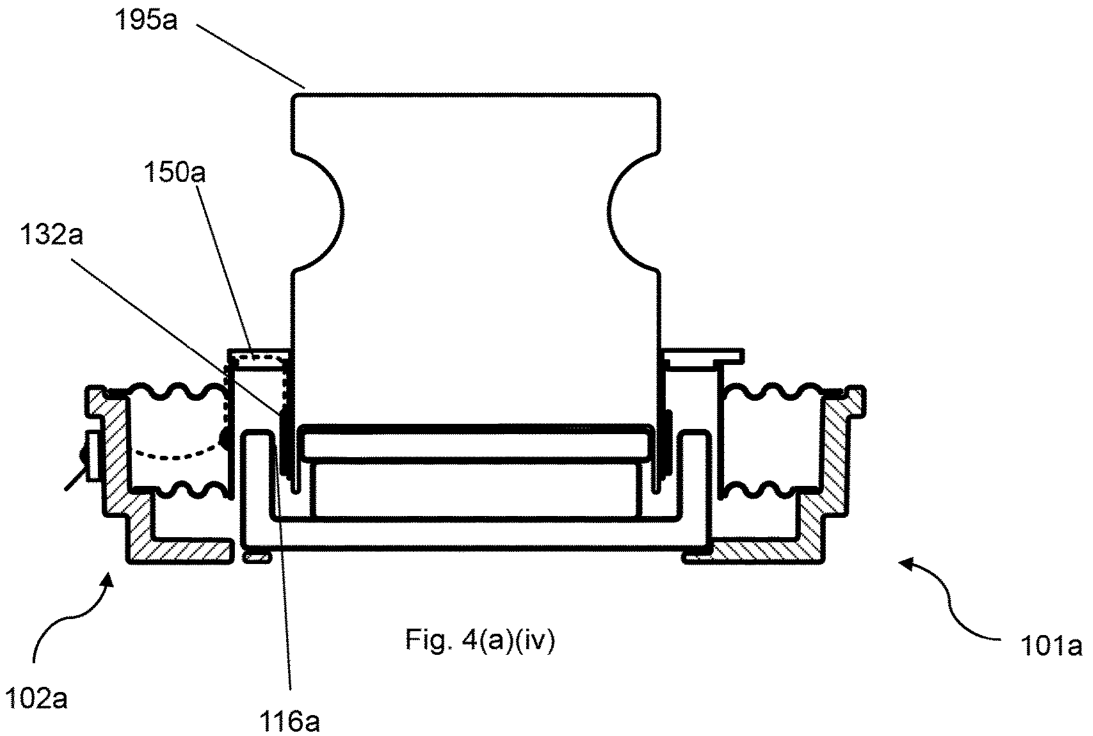
FIG. 4(*a*)(*i*)-(*v*) show a first drive unit 101*a* that exemplifies a drive unit of the inner magnet type, and a loudspeaker 180*a* incorporating the first drive unit 101*a*.
Figure 4A:
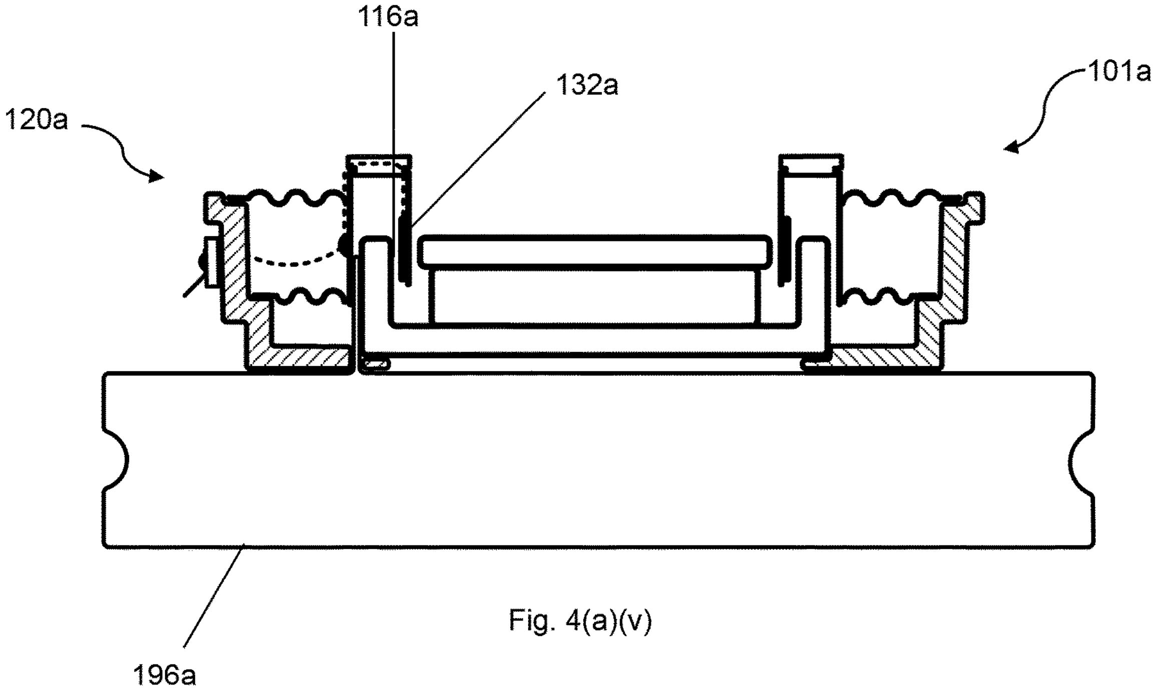
Figure 4C:
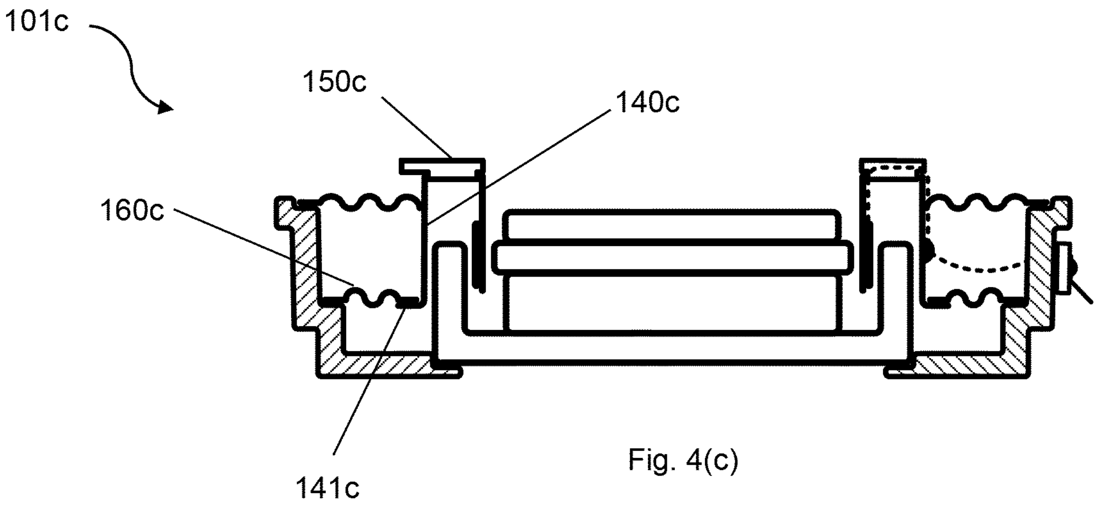
Figure 4D:
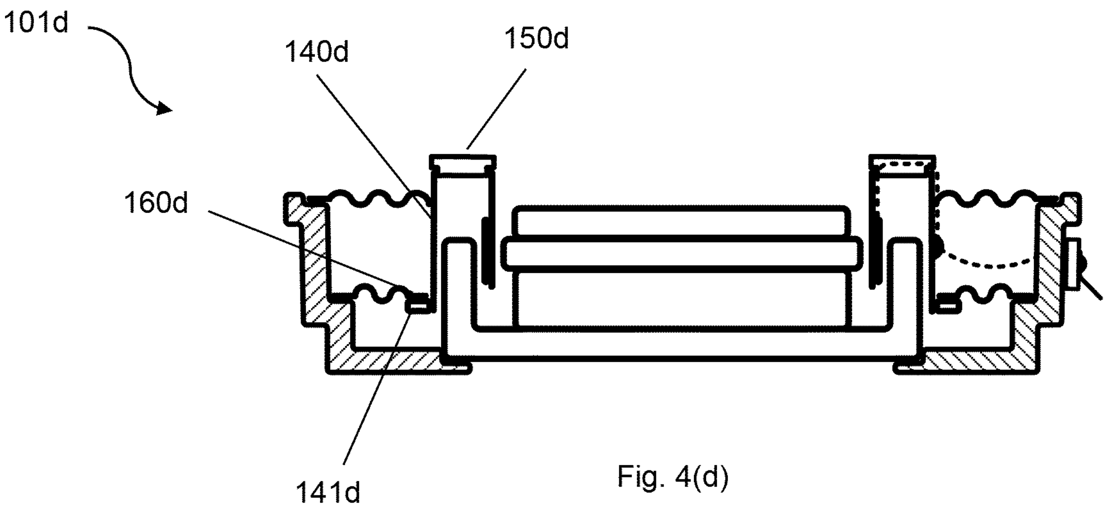
Figure 4E:
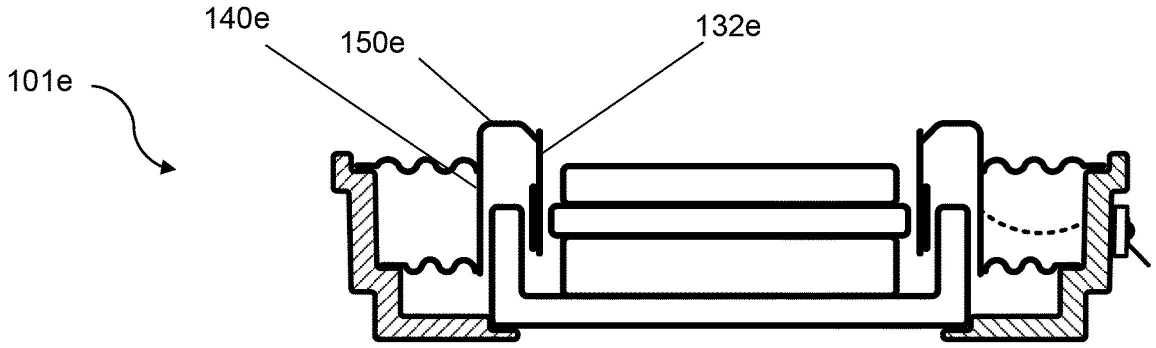
Figure 4F:
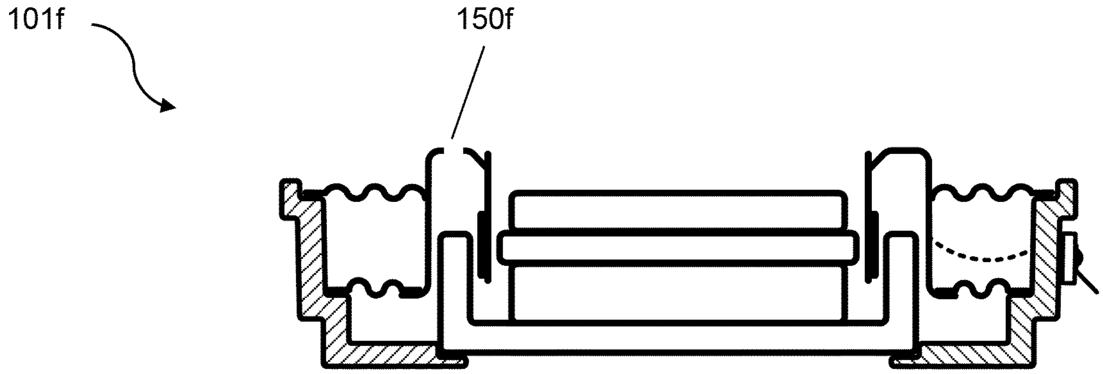
Figure 4G:
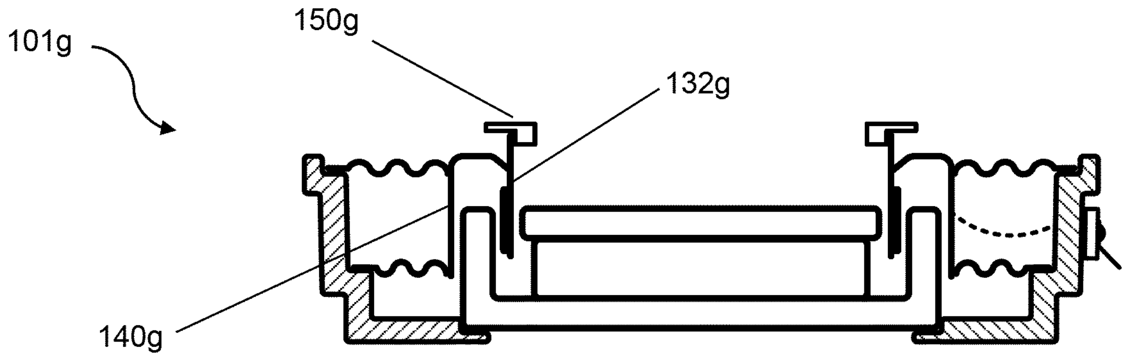
Figure 4H:
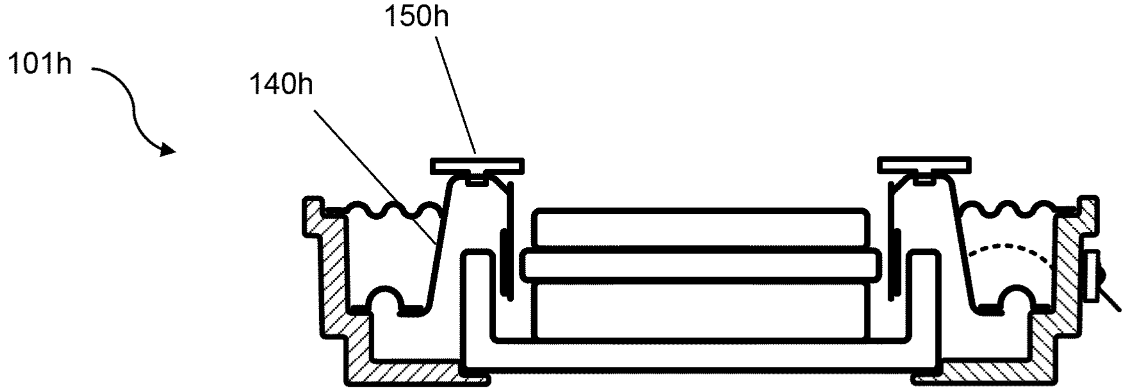
Figure 4K:
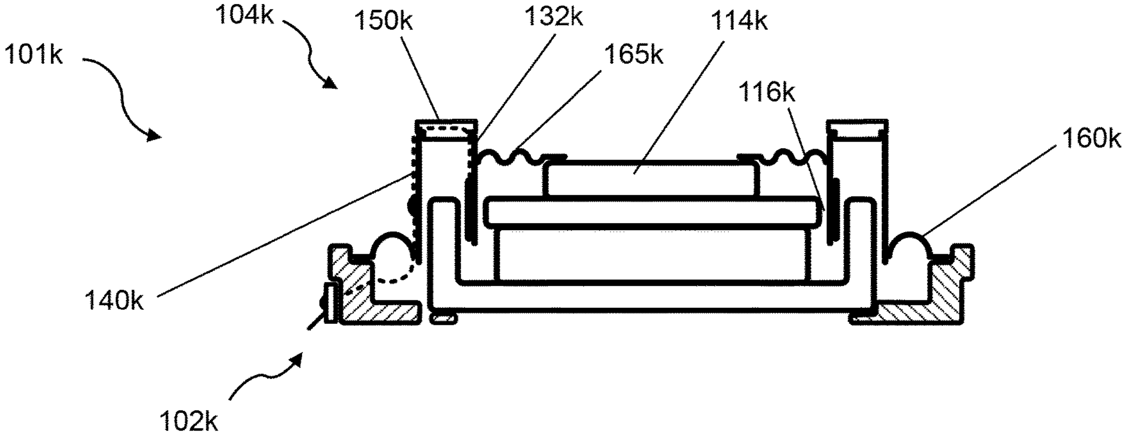
Figure 4L:
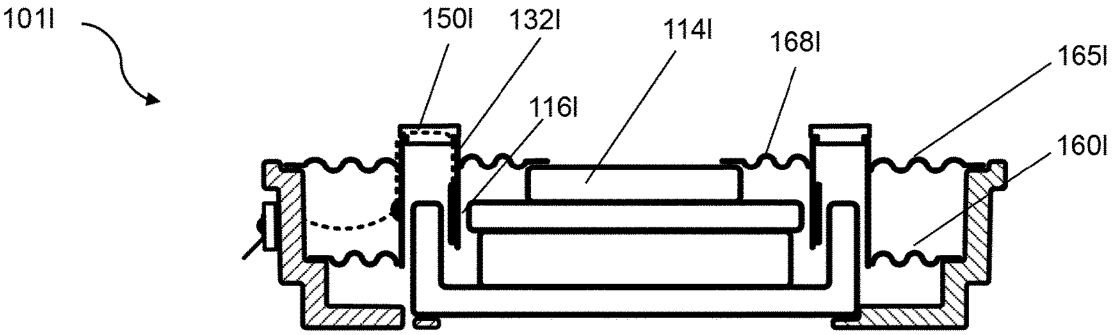

A first drive unit 101*a* that exemplifies an drive unit of the inner magnet type is shown in FIG. 4(*a*)(*i*).

Here, we note for completeness that the drive unit 101*a* is referred to as a drive unit because it is intended for use in a loudspeaker where an acoustic radiator is suspended from a magnet assembly of the drive unit.

Were the drive unit 101*a* intended for use in a loudspeaker where a magnet assembly of the drive unit is suspended from an acoustic radiator, then the drive unit 101*a* might instead be referred to as an "inertial exciter". The terms "drive unit" and "inertial exciter" can thus be used interchangeably in relation to the drive unit 101*a*, until the drive unit 101*a* is incorporated into a loudspeaker, at which point the drive unit 101*a* should be referred to as an "inertial exciter" only if the loudspeaker has a magnet assembly of the drive unit suspended from an acoustic radiator.

The drive unit 101*a* of FIG. 4(*a*) comprises a magnet assembly 102*a* and a coil assembly 104*a*.

The magnet assembly 102*a* includes a magnet unit 110*a* and a frame 120*a* to which the magnet unit 110*a* is attached.

In this example, the magnet unit 110*a* includes a main magnet 112*a*, a washer 113*a* an extra magnet 114*a* and a U-yoke 115*a*. The magnet unit 110*a* is configured to provide a magnetic field in an air gap 116*a*. The air gap 116*a* extends around a movement axis 106*a* of the drive unit 101*a*.

The frame 120*a* includes a base portion 122*a* which extends radially outwardly with respect to the movement axis 106*a* (in this example from a base of the U-yoke 115*a*), and a rim 124*a* which extends axially with respect to the movement axis 106*a*, that is at least partly along the movement axis 106*a*. The rim 124*a* of the frame 120*a* is positioned at the periphery of the base portion 122*a*, and is positioned radially outwardly of the magnet unit 110*a*.

The rim 124*a* of the frame 120*a* is positioned radially outwardly of a tubular member 140*a*, and thus serves as the "part of the magnet assembly positioned radially outwardly of the tubular member" referenced in the "Summary of the invention" section of this document, above.

In this example, the main magnet 112*a*, washer 113*a*, extra magnet 114*a*, U-yoke 115*a*, and air gap 116*a* are circular, though other forms are possible.

In this example, the washer 114*a* and U-yoke 116*a* may be made of steel, though other materials are possible.

In this example, the coil assembly 104*a* includes a voice coil 130*a*, a voice coil former 132*a*, a tubular member 140*a* and an attachment portion 150*a*.

In this example, the attachment portion 150*a* is a coupling element which is separately attached to the voice coil former and tubular member, e.g. by glue. The coupling element 150*a* is configured to provide an attachment between the coil assembly 104*a* and an acoustic radiator (not shown) by including a gluing surface 151*a* configured to be glued to the acoustic radiator. The coupling element 150*a* could for example be a plastic or cardboard ring-shaped element.

The voice coil former 132*a* extends axially with respect to the movement axis 106*a* from the coupling element 150*a* into the air gap 116*a*. The voice coil 130*a* is mounted to the voice coil former 132*a* so that the voice coil 130*a* sits in the air gap 116*a* when the drive unit 101*a* is at rest.

The tubular member 140*a* is positioned radially outwardly of the voice coil former 132*a* with respect to the movement axis 106*a*. The tubular member 140*a* also overlaps the voice coil former 132*a* along a portion of the movement axis (this portion corresponding to the full length of the voice coil former 132*a*).

In this example, the voice coil former 132*a* and tubular member 140*a* are cylindrical, though other shapes are possible.

Two planes are depicted in FIG. 4(*a*)(*i*).

A first plane 108*a* is perpendicular to the movement axis 106*a* and extends through the attachment portion which as noted above is the coupling element 150*a*.

A second plane 109*a* is perpendicular to the movement axis 106*a* and extends through the air gap 116*a*.

The rim 124*a* of the frame 120*a* includes:

- a proximal portion, wherein the proximal portion of the rim 124*a* is located between the first plane 108*a* and the second plane 109*a*; and
- a distal portion, wherein the distal portion of the rim 124*a* is located is on an opposite side of the second plane 109*a* from the proximal portion of the rim 124*a*.

The tubular member 140*a* similarly includes:

- a proximal portion, wherein the proximal portion of the tubular member 140*a* is located between the first plane 108*a* and the second plane 109*a*; and
- a distal portion, wherein the distal portion of the tubular member 140*a* is located is on an opposite side of the second plane 109*a* from the proximal portion of the of the tubular member 140*a*.

The drive unit 101*a* includes:

- a first drive unit suspension 160*a* that is attached to the distal portion of the tubular member 140*a* and the distal portion of the rim 124*a*; and
- a second drive unit suspension 165*a* that is attached to the proximal portion of the tubular member 140*a* and the proximal portion of the rim 124*a*.

Each drive unit suspension 160*a*, 165*a* in this example is a spider including multiple corrugations. Such drive unit suspensions are well known in the art.

Thus, when the coil assembly 104*a* is attached to the acoustic radiator via the attachment portion/coupling element 150*a*, the acoustic radiator is suspended from the magnet assembly 102*a* via the coil assembly 104*a* by the first and second drive unit suspensions 160*a*, 165*a*.

As can be seen from FIG. 4(*a*)(*i*), the rim 124*a* of the frame 120*a* includes a first ledge 125*a* to which the first drive unit suspension 160*a* is attached, and a second ledge 126*a* to which the second drive unit suspension 165*a* is attached.

In this example, the first and second drive unit suspensions 160*a*, 165*a* are each shown as a respective spider having multiple corrugations.

The drive unit 101*a* includes wires 134*a*, 135*a* configured to provide an electrical path for supplying an electrical current carrying an audio signal (representative of sound) to the voice coil 130*a*.

The electrical path provided by the wires 134*a*, 135*a* extend from a connector 138*a* formed on an outwardly facing surface of the rim 124*a* of the frame 120*a* to the voice coil 130*a*.

In this example, the wires include part of the voice coil winding 134*a* as well as a lead wire 135*a*. In this example, the voice coil winding 134*a* extends around the tubular member 140*a* as guided by the coupling element 150*a*.

The voice coil winding 134*a* and lead wire 135*a* meet at an electrical junction formed at a solderpad or glue dot 136*a* on an outwardly facing surface of the tubular member 140*a*.

FIG. 4(*a*)(*ii*) shows a loudspeaker 180*a* including the drive unit 101*a* of FIG. 4(*a*)(*i*) and an acoustic radiator 190*a* suspended from the magnet assembly 102*a*, wherein the coil assembly 104*a* of the drive unit 101*a* is attached to the acoustic radiator 190*a* via the attachment portion/coupling element 150*a* so that the acoustic radiator 190*a* is suspended from the magnet assembly 102*a* via the coil assembly by the first and second drive unit suspensions 160*a*, 165*a*.

Preferably, the magnet assembly 102*a* is itself suspended from a mounting frame via at least one mounting frame suspension (not shown here, but shown in the examples discussed below under the heading "Loudspeakers in which the magnet assembly is suspended from a mounting frame").

In use, electrical current carrying an audio signal is supplied to the voice coil 130*a* via the connector 138*a* and wires 134*a*, 135*a*. This energises the voice coil 130*a* and causes a magnetic field to be produced by the current in the voice coil 130*a*, which interacts with the magnetic field produced in the air gap 116*a* by the magnet unit 110*a*, and causes the voice coil assembly 104*a* to move relative to the magnet assembly 102*a*. This relative movement is accommodated by the first and second drive unit suspensions 160*a*, 165*a*.

Because the acoustic radiator 190*a* is suspended from the magnet assembly 102*a* via the coil assembly 104*a* by the first and second drive unit suspensions 160*a*, 165*a*, the loudspeaker is able to be moved by MC and MM excitation.

Because the voice coil former 132*a* and tubular member 140*a* are tubular, they provide good stiffness even when made of a lightweight material such as paper, cardboard, Kapton, aluminium, kevlar etc. Thus, the voice coil assembly 104*a* can have low weight and good stiffness, as is needed for good wide bandwidth performance from MC excitation.

Moreover, because the tubular member 140*a* has a distal portion which overlaps the voice coil former 132*a* so as to extend beyond the air gap 116*a*, i.e. to the opposite side of the second plane 109*a* from the proximal portion of the tubular member 140*a*, it is possible to have a large distance between the first and second drive unit suspensions 160*a*, 165*a*, which helps inhibit rotation of the voice coil assembly 104*a* relative to the magnet assembly 102*a* when the loudspeaker is vertically mounted.

Note that this is achieved whilst providing one interface (the glue surface of the coupling element 150*a*) with the acoustic radiator 190*a*, and also whilst permitting MC excitation. The low mass of the voice coil assembly (see above) help to achieve acoustic sensitivity and balance in the upper frequency band, as depicted in FIG. 4(*a*)(*iii*).

FIG. 4(*a*)(*iv*) shows a method step involved in assembling the drive unit 101*a* which makes use of a conventional centering jig 195*a* to align the voice coil former 132*a* in the air gap 116*a* before the components of the voice coil assembly 104*a* are glued together. The coupling element 150*a* may be flush with an inwardly facing surface of the voice coil former 132*a* to facilitate use of the centering jig 195*a*.

FIG. 4(*a*)(*v*) shows an alternative or additional method step involved in assembling the drive unit 101*a* in which apertures are incorporated into the frame 120*a* to allow a centering jig 196*a* to be inserted into the apertures during assembly, e.g. to help with aligning the voice coil former 132*a* in the air gap 116*a*.

Preferably the voice coil assembly (including the coupling element 150*am* the voice coil 130*a*, voice coil former 132*a* and the tubular member 140*a*) could be pre-assembled on a separate jig (not shown) before being assembled in the magnet assembly 102*a*.

Various alternative inner magnet examples will now be described. Alike features have been given alike reference numerals where appropriate and are not described in further detail, except where necessary.

A second drive unit 101*b* that exemplifies an drive unit of the inner magnet type is shown in FIG. 4(*b*)(*i*).

The coupling element 150*b* of the drive unit 101*b* is shown in FIG. 4(*b*)(*ii*) and includes bayonet features in the form of radial extensions 151*b* configured to engage with corresponding bayonet features 191*b* on the acoustic radiator 190*b* shown in FIG. 4(*b*)(*iii*) to provide a bayonet attachment between the coupling element 150*b* and the acoustic radiator 190*b*. The bayonet features 191*b* on the acoustic radiator preferably form slots for accommodating the radial extensions 151*b*. The resulting loudspeaker 180*b* is shown in FIG. 4(*b*)(*iv*).

The above-described bayonet feature could facilitate assembly and replacement of the drive unit 101*b* to the acoustic radiator 190*b*.

The above-described bayonet features could be combined with adhesives or filler (e.g. grease) to avoid rattling during operation. The adhesive or filler could have temperature dependent properties so that by applying heat the drive unit 101*b* can be replaced.

A third drive unit 101*c* that exemplifies a drive unit of the inner magnet type is shown in FIG. 4(*c*).

In this example, the tubular member 140*c* includes a collar 141*c* that provides a flat face to facilitate gluing of the first drive unit suspension 160*c*, which in this example could be a fabric damper, a metal or plastic spiral spring, a rubber element, etc.

A fourth drive unit 101*d* that exemplifies a drive unit of the inner magnet type is shown in FIG. 4(*d*).

In this example, the a ring 141*d*, e.g. made of cardboard or plastic, is attached to the distal portion of the tubular member 140*d* to provide a flat surface 141*d* to facilitate gluing of the first drive unit suspension 160*d*.

A fifth drive unit 101*e* that exemplifies a drive unit of the inner magnet type is shown in FIG. 4(*e*).

In this example, the tubular member 140*e* is integrally formed with the attachment portion 150*e* by appropriately shaping the tubular member 140*e* to include the attachment portion 150*e*. This allows the tubular member 140*e* to be glued directly to the voice coil former 132*e*, and avoids the use of a coupling element as described in previous examples. In this example, the attachment portion 150*e* is a flat face of the tubular member 140*e* that is configured to be glued to the acoustic radiator (not shown).

The tubular member 140*e* could be made of paper, cardboard, Kapton, aluminium, kevlar, PE, ABS etc.

A sixth drive unit 101*f* that exemplifies a drive unit of the inner magnet type is shown in FIG. 4(*f*).

The drive unit 101*f* is the same as the fifth drive unit 101*e* shown in FIG. 4(*e*), except that holes are formed in the attachment portion 150*f* to enhance the glue attachment to the acoustic radiator (not shown).

A seventh drive unit 101*g* that exemplifies a drive unit of the inner magnet type is shown in FIG. 4(*g*).

In this example, the coupling element 150*g* is attached only to the voice coil former 132*g*, with the tubular member 140*g* being attached to the voice coil former 132*g*.

An eighth drive unit 101*h* that exemplifies a drive unit of the inner magnet type is shown in FIG. 4(*h*).

In this example, the tubular member 140*h* forms an angle with respect to the movement axis, thereby forming a frusto-conical tubular member 140*h*. In this case, the angle is preferably no more than 15°.

A tubular member 140*h* shaped in this way could facilitate the making of the tubular member 140*h* from paper or from plastic in a deep draw process.

In this example, the tubular member 140*h* is again integrally formed with the attachment portion 150*h* by appropriately shaping the tubular member 140*h* to include the attachment portion 150*h*.

A ninth drive unit 101*i* that exemplifies a drive unit of the inner magnet type is shown in FIG. 4(*i*)(*i*).

This example is essentially the same as the first drive unit 101*a* shown in FIG. 4(*a*)(*i*), except that in this case the first and second drive unit suspensions 160*i*, 165*i* include only a single corrugation, and the single corrugations mirror each other (in a plane 108*i* perpendicular to the movement axis 106*i*) to help cancel asymmetries in stiffness between the two drive unit suspensions 160*i*, 165*i*. The first and second drive unit suspensions 160*i*, 165*i* may in this case be roll drive unit suspensions, e.g. made of rubber, textile or foam.

FIG. 4(*i*)(*ii*) show the attachment between the frame 120*i* and the drive unit suspensions 160*i*, 165*i*. In this particular example, the rim of the frame 120*i* is provided in two parts, 124*i*(*i*) and 124*i*(*ii*).

Example dimensions are drawn on FIG. 4(*i*)(*i*) and FIG. 4(*i*)(*ii*), noting that the distance between locations at which the two drive unit suspensions 160*i*, 165*i* attach to the rim of the magnet assembly is 6.3 mm in this example, which is large given the overall size of the drive unit 101*i*.

FIGS. 4(*i*)(*iii*)-(*viii*) are 3D views showing the drive unit 101*i* from various angles.

A tenth drive unit 101*j* that exemplifies an drive unit of the inner magnet type is shown in FIG. 4(*j*)(*i*).

The drive unit 101*j* shown in FIG. 4(*j*)(*i*) is the same as the drive unit 101*a* shown in FIG. 4(*a*)(*i*) except that the drive unit includes an alternative form of first and second drive unit suspensions 160*j*, 165*j*.

The alternative form of drive unit suspension used for the first and second drive unit suspensions 160*j*, 165*j* is shown in more detail in FIG. 4(*j*)(*ii*).

As can be seen most clearly from FIG. 4(*j*)(*ii*), the alternative form of first and second drive unit suspensions 160*j*, 165*j* is a piece of sheet material having a geometry configured to allow deflection in a direction parallel to the movement axis 106*j*, whilst inhibiting movement in a direction perpendicular to the movement axis 106*j*.

A suitable material for the alternative form of first and second drive unit suspensions 160*j*, 165*j* could be a fiber-reinforced plastic, e.g. a polymer matrix reinforced with glass fibres or carbon fibres, or a metal, e.g. steel spring material.

An eleventh drive unit 101*k* that exemplifies a drive unit of the inner magnet type is shown in FIG. 4(*k*).

The drive unit 101*k* shown in FIG. 4(*k*) is the same as the drive unit 101*a* shown in FIG. 4(*a*)(*i*) except that in this example the second drive unit suspension 165*k* is attached to a proximal portion of the voice coil former 132*k* and a proximal portion of a part of the magnet assembly positioned radially inwardly of the voice coil former (in this case the extra magnet 114*k*).

Note, that in this case the drive unit 101*k* has:

- a first drive unit suspension 160*k* that is attached to a distal portion of the tubular member 140*k* and the distal portion of the rim 124*k*; and
- a second drive unit suspension 165*k* that is attached to a proximal portion of the voice coil former 132*k* and a proximal portion of a part of the magnet assembly positioned radially inwardly of the voice coil former 132*k* (in this case the extra magnet 114*k*).

Thus, this arrangement still allows for a wide separation between the first and second drive unit suspensions 160*k*, 165*k*, thereby helping to inhibit rotation of the magnet assembly 102*k* relative to the voice coil assembly 104*k*.

Besides providing drive unit suspension, the second drive unit suspension 165*k* can also serve as a dust cover to prevent dust in the airgap 116*k* prior to mounting the drive unit 101*k* to an acoustic radiator.

In this example, the first drive unit suspension 165*k* is a roll drive unit suspension including only one corrugation.

A twelfth drive unit 101*l* that exemplifies a drive unit of the inner magnet type is shown in FIG. 4(*l*).

The drive unit 101*l* shown in FIG. 4(*l*) is the same as the drive unit 101*a* shown in FIG. 4(*a*)(*i*) except that a third drive unit suspension 168*l* is attached to a proximal portion of the voice coil former 132*l* and a proximal portion of a part of the magnet assembly positioned radially inwardly of the voice coil former (in this case the extra magnet 114*l*).

Besides providing drive unit suspension, the third drive unit suspension 168*l* can also serve as a dust cover to prevent dust in the airgap 116*l* prior to mounting the acoustic radiator to the drive unit 101*l*.

Drive Unit—Outer Magnet Type Examples

Figure 5A:
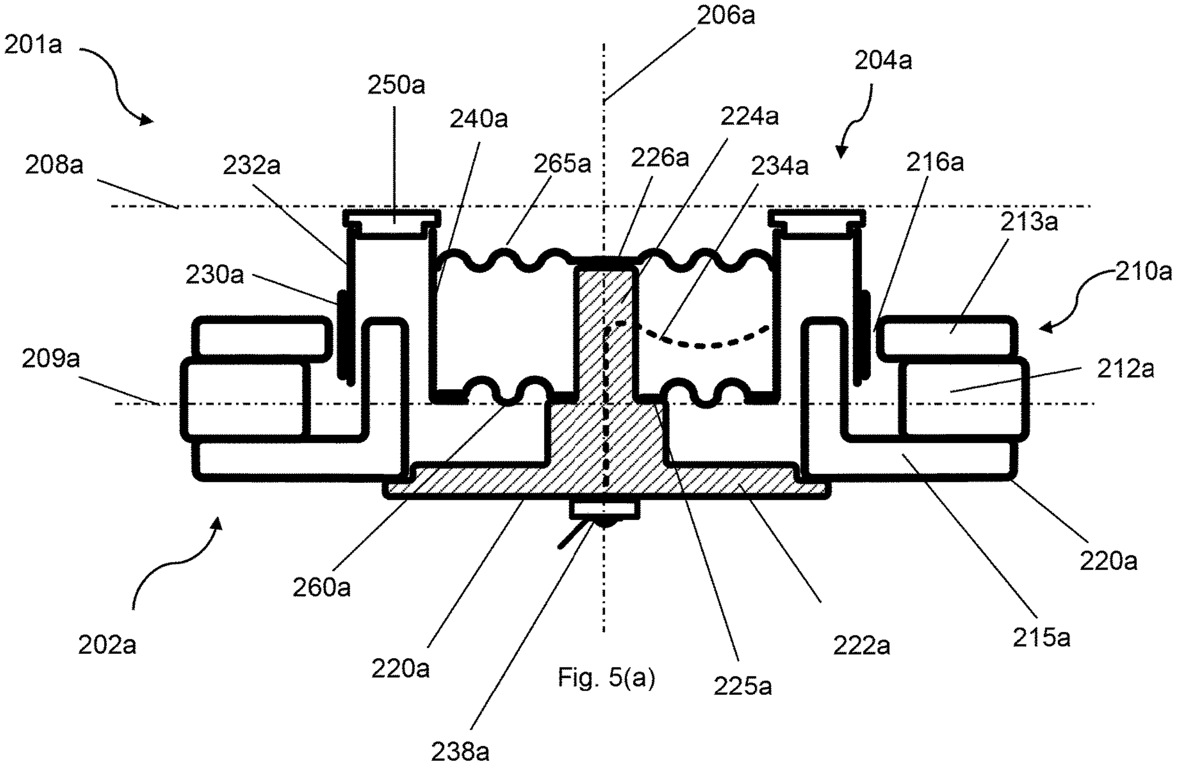
FIG. 5(*a*) shows a first drive unit 201*a* that exemplifies a drive unit of the outer magnet type.
Figure 5B:
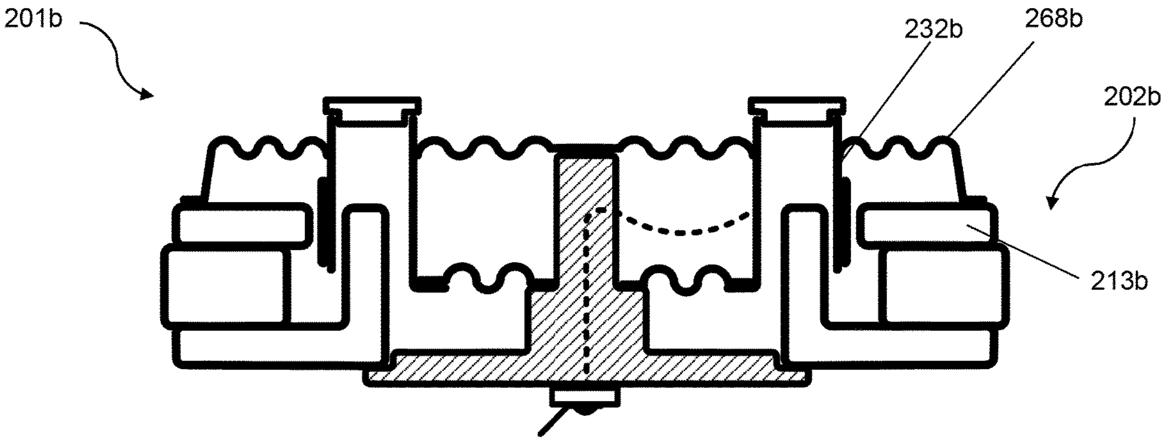
Figure 5C:
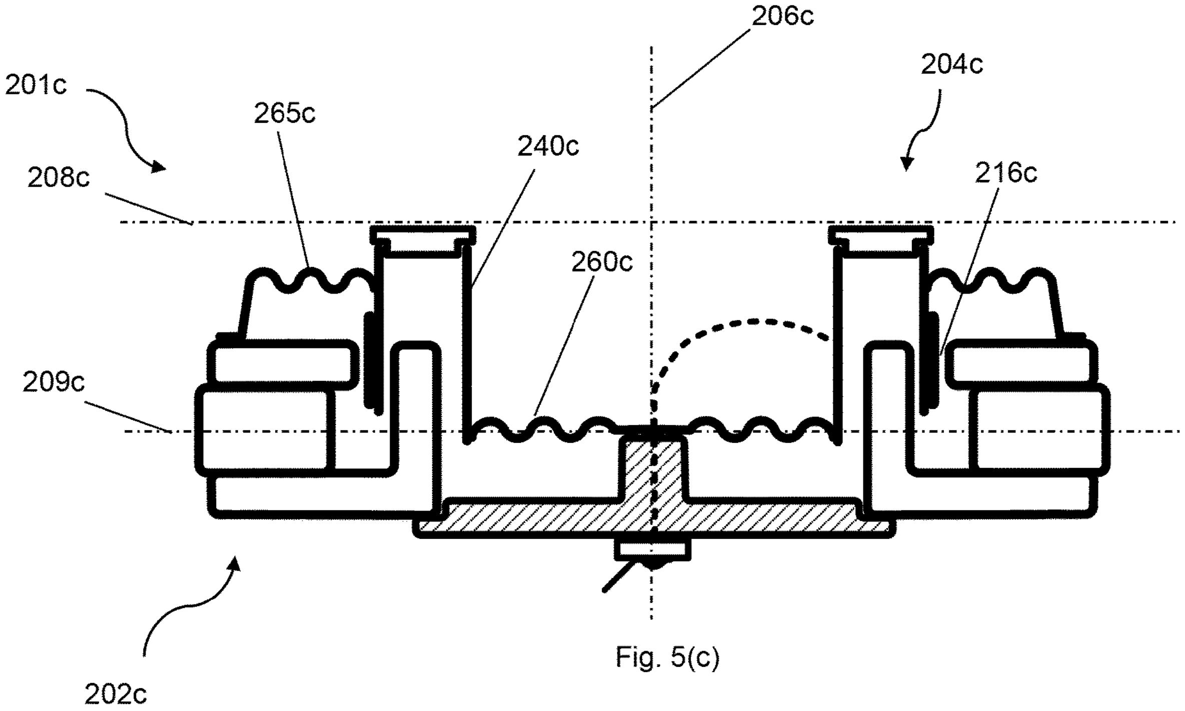
Figure 5D:
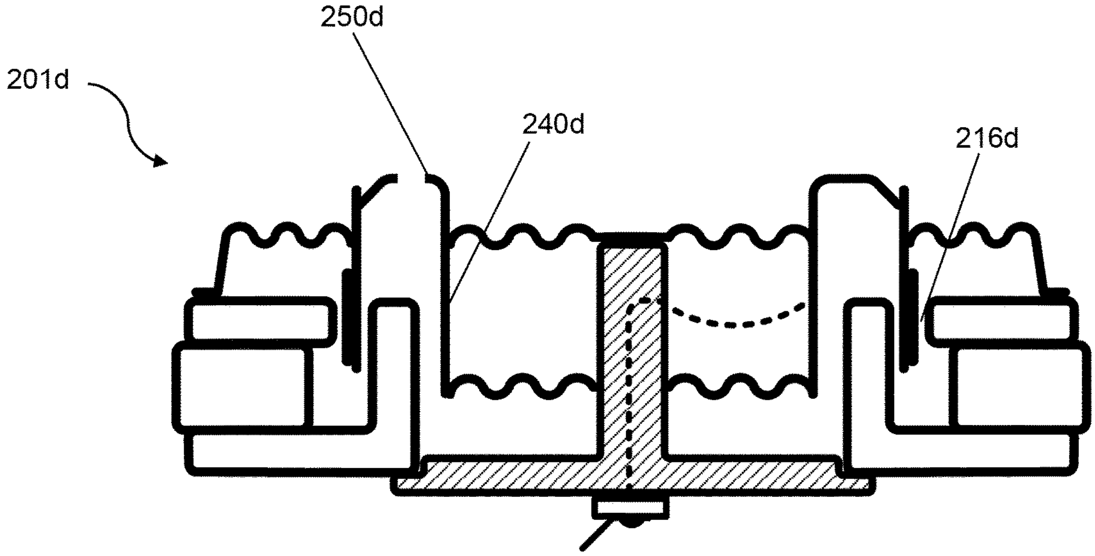

A first drive unit 201*a* that exemplifies a drive unit of the outer magnet type is shown in FIG. 5(*a*).

The drive unit 201*a* shown in FIG. 5(*a*) includes many features which are common to the drive unit 101*a* shown in FIG. 4(*a*)(*i*). Alike features have been given alike reference numerals where appropriate and are not described in further detail, except where necessary.

The magnet assembly 202*a* includes a magnet unit 210*a* and a frame 220*a* to which the magnet unit 210*a* is attached.

In this example, the magnet unit 210*a* includes a (ring-shaped) main magnet 212*a*, a (ring-shaped) washer 213*a* and a T-yoke 215*a* (which looks like an upside down "T" as drawn). The magnet unit 210*a* is configured to provide a magnetic field in an air gap 216*a*. The air gap 216*a* extends around a movement axis 206*a* of the drive unit 201*a*.

The outer magnet type examples can be useful as they allow more magnet material to be used compared with the inner magnet type examples, and therefore enable more powerful exciters, as may be desirable in some cases.

In this example, the frame 220*a* includes a base portion 222*a* which extends radially inwardly with respect to the movement axis 206*a* (in this example from a base of the T-yoke 215*a*).

In this example, the frame 220*a* also include a hub 224*a* which extends axially with respect to the movement axis 206*a*, that is at least partly along the movement axis 206*a*. The hub 224*a* of the frame 220*a* is positioned at the centre of the base portion 222*a*, and is positioned radially inwardly of the tubular member 240*a*.

In this example, the tubular member 240*a* is positioned radially inwardly of the voice coil former 232*a* with respect to the movement axis 206*a*, and overlaps the voice coil former 232*a* along at least a portion of the movement axis 206*a*.

The drive unit 201*a* includes:

- a first drive unit suspension 260*a* that is attached to a distal portion of the tubular member 240*a* and the distal portion of the hub 224*a*; and
- a second drive unit suspension 265*a* that is attached to the proximal portion of the tubular member 240*a* and the proximal portion of the hub 224*a*.

The proximal portions of the tubular member 240*a* and hub 224*a* are located between the first plane 208*a* and the second plane 209*a* as defined above. The proximal portions of the tubular member 240*a* and hub 224*a* are located on an opposite side of the second plane 209*a* from the proximal portions.

As can be seen from FIG. 5(*a*), the hub 224*a* of the frame 220*a* includes a first ledge 225*a* to which the first drive unit suspension 260*a* is attached, and a second ledge 226*a* to which the second drive unit suspension 265*a* is attached.

In this example, the drive unit 201*a* includes a lead wire 234*a* configured to provide an electrical path for supplying an electrical current carrying an audio signal (representative of sound) to the voice coil 130*a*.

In this example, the electrical path provided by the lead wire 234*a* extend from a connector 238*a* formed on an outwardly facing surface of the base portion 222 of the frame 220*a* (outward in the sense of facing away from the hub 224*a*) to the voice coil 230*a*.

In this example, the lead wire 234*a* extends through the frame 220*a*.

In this example, the coupling element 250*a* is similar to that shown in FIG. 4(*a*)(*i*).

In use, electrical current carrying an audio signal is supplied to the voice coil 230*a* via the connector 238*a* and lead wire 234*a*. This energises the voice coil 230*a* and causes a magnetic field to be produced by the current in the voice coil 230*a*, which interacts with the magnetic field produced in the air gap 216*a* by the magnet unit 210*a*, and causes the voice coil assembly 204*a* to move relative to the magnet assembly 202*a*. This relative movement is accommodated by the first and second drive unit suspensions 260*a*, 265*a*.

Various alternative inner magnet examples will now be described. Alike features have been given alike reference numerals where appropriate and are not described in further detail, except where necessary.

A second drive unit 201*b* that exemplifies a drive unit of the outer magnet type is shown in FIG. 5(*b*).

This example is that same as that shown in FIG. 5(*a*), except that a third drive unit suspension 268*b* is attached to the voice coil former 232*b* and to a part of the magnet assembly 202*b* (in this case the washer 213*b*) positioned radially outwardly of the voice coil former 232*a*.

Besides providing drive unit suspension, the third drive unit suspension 268*b* can also serve as a dust cover to prevent dust in the airgap 216*b* when the drive unit 201*b* is in use.

A third drive unit 201*c* that exemplifies a drive unit of the outer magnet type is shown in FIG. 5(*c*).

This example is that same as that shown in FIG. 5(*a*), except that in this example the second drive unit suspension 265*c* is attached to the voice coil former 232*b* and to a part of the magnet assembly 202*b* (in this case the washer 213*b*) positioned radially outwardly of the voice coil former 232*a*.

Note, that in this case the drive unit 201*c* has:

- a first drive unit suspension 260*c* that is attached to a distal portion of the tubular member 240*c* and the distal portion of the hub 224*c*; and
- an second drive unit suspension 265*c* that is attached to a proximal portion of the tubular member 240*c* and a proximal portion of a part of the magnet assembly positioned radially outwardly of the tubular member 240*c* (in this case the washer 213*b*).

Thus, this arrangement still allows for a wide separation between the first and second drive unit suspensions 160*k*, 165*k*, thereby helping to inhibit rotation of the magnet assembly 202*c* relative to the voice coil assembly 204*c*.

Besides providing suspension, the second drive unit suspension 265*c* can also serve as a dust cover to prevent dust in the airgap 216*c* when the drive unit 201*b* is in use.

A fourth drive unit 201*d* that exemplifies a drive unit of the outer magnet type is shown in FIG. 5(*d*).

This example is that same as that shown in FIG. 5(*b*), except that:

- the tubular member 240*d* is integrally formed with the attachment portion 250*d* by appropriately shaping the tubular member 240*d* to include the attachment portion 250*d*.
- holes are formed in the attachment portion 250*d* to enhance the glue attachment to the acoustic radiator (not shown)

Loudspeakers in which the Magnet Assembly is Suspended from a Mounting Frame

In all the examples that follow, an acoustic radiator is suspended from the magnet assembly by at least one drive unit suspension, and the magnet assembly is suspended from a mounting frame by at least one mounting frame suspension. Although such an arrangement is only explicitly shown in the examples that follow, a skilled person would appreciate that such an arrangement could equally be adopted with all of the drive units previously discussed.

In the examples loudspeakers that follow, the drive units includes many features which are common to the drive unit 101*a* shown in FIG. 4(*a*)(*i*). Alike features have been given alike reference numerals where appropriate and such features are not described in further detail, except where necessary. In some examples, the acoustic radiator is omitted for clarity, but it would be appreciated in all cases that the loudspeaker would have an acoustic radiator attached to the coil assembly, wherein the attachment portion provides the attachment between the coil assembly and the acoustic radiator.

In all the examples that follow, the loudspeakers incorporate drive unit of the outer magnet type, but a skilled person would readily appreciate that drive units of the inner magnet type could equally be used.

In all the examples that follow, the loudspeaker is preferably configured to move the diaphragm at bass frequencies and is configured to be used as a dipole loudspeaker, e.g. as described in [14].

Figure 6A:
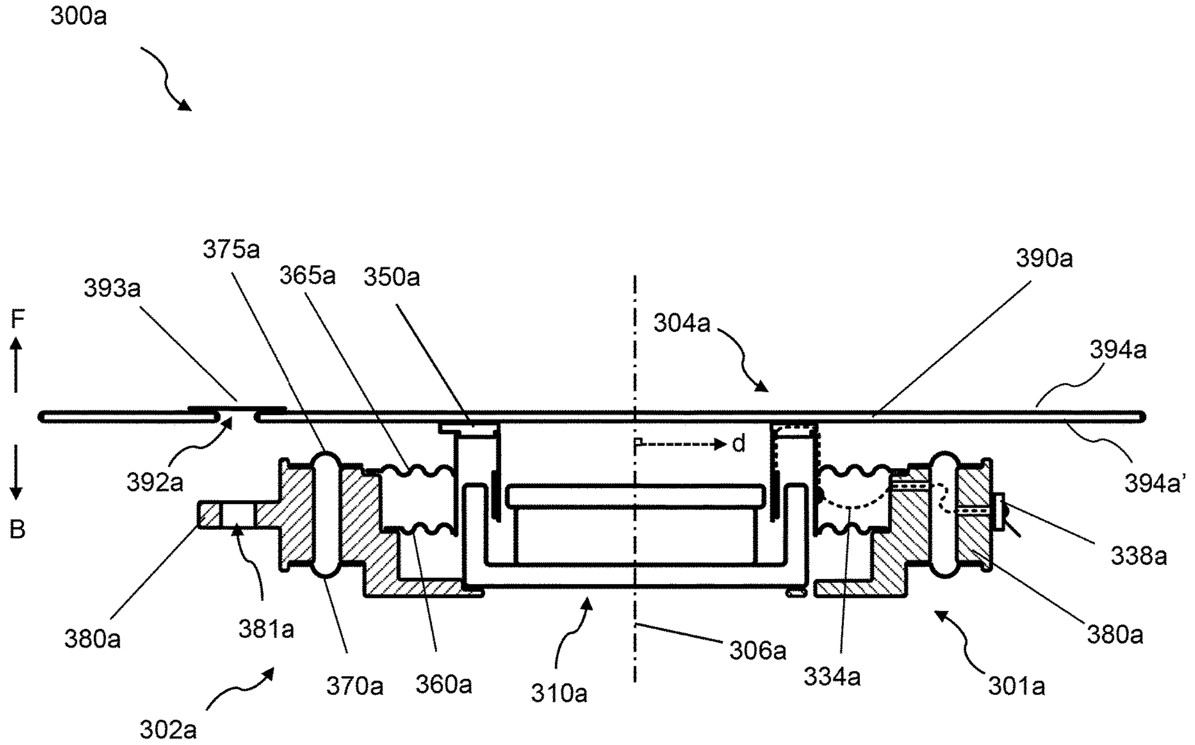
FIG. 6(*a*) shows a first example loudspeaker.
Figure 6B:
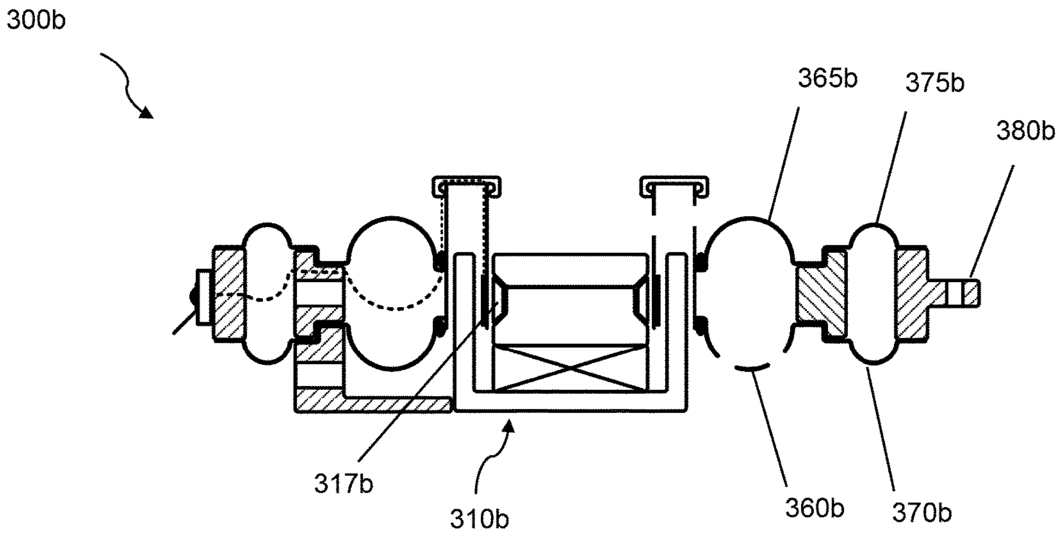
Figure 6C:
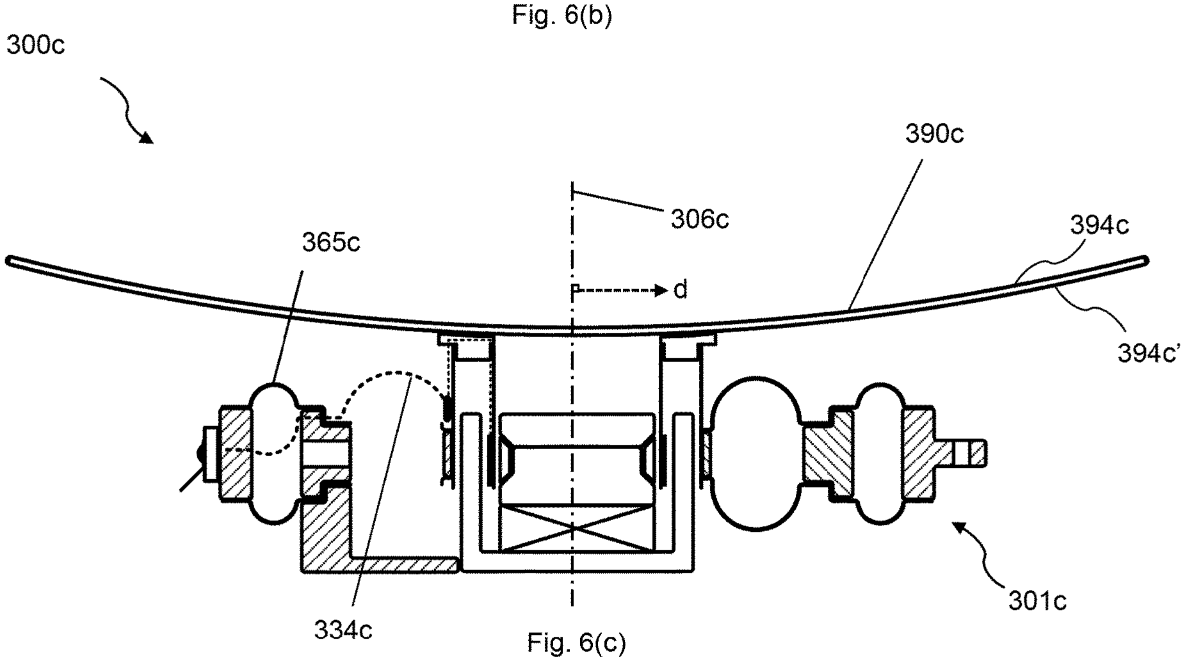
Figure 6F:
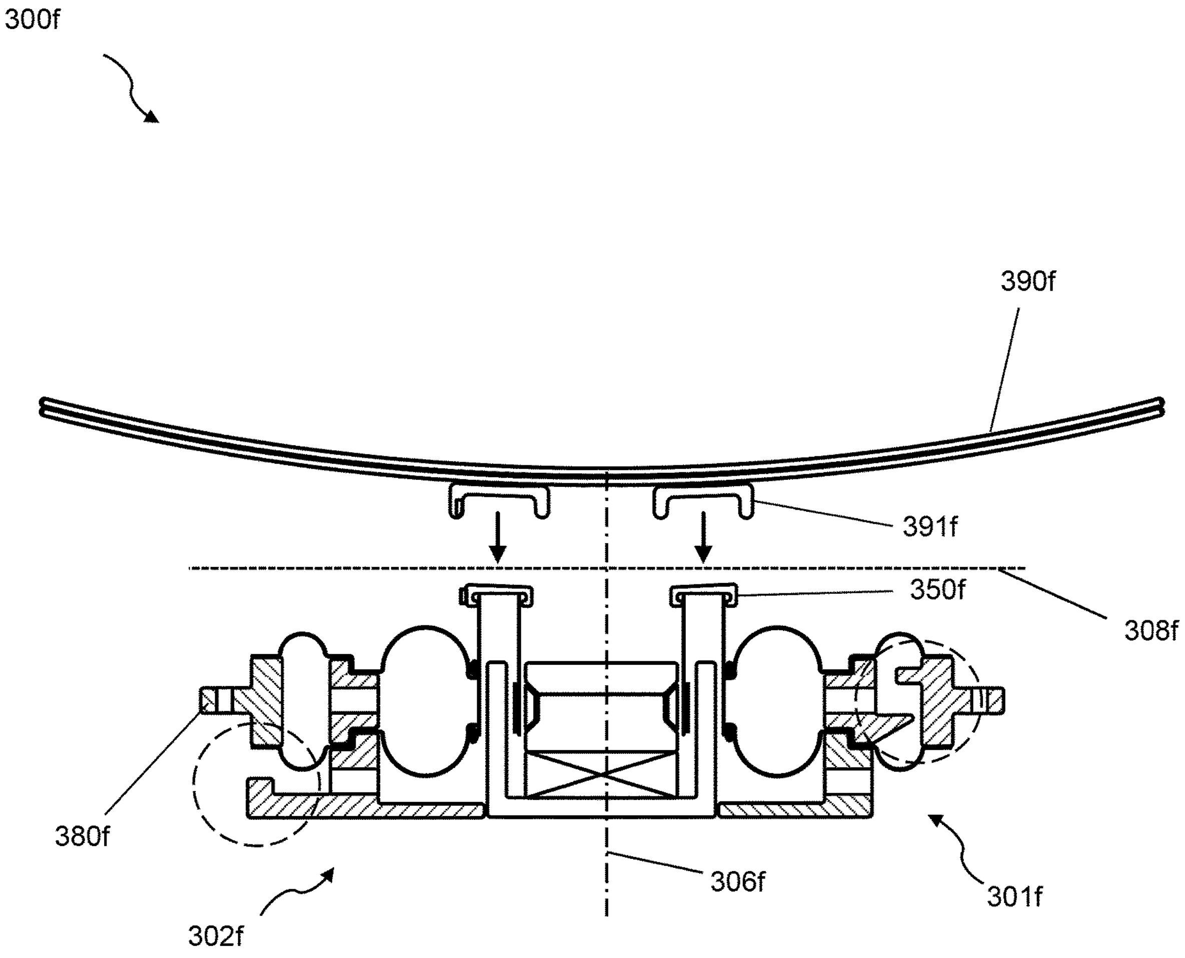
Figure 6G:
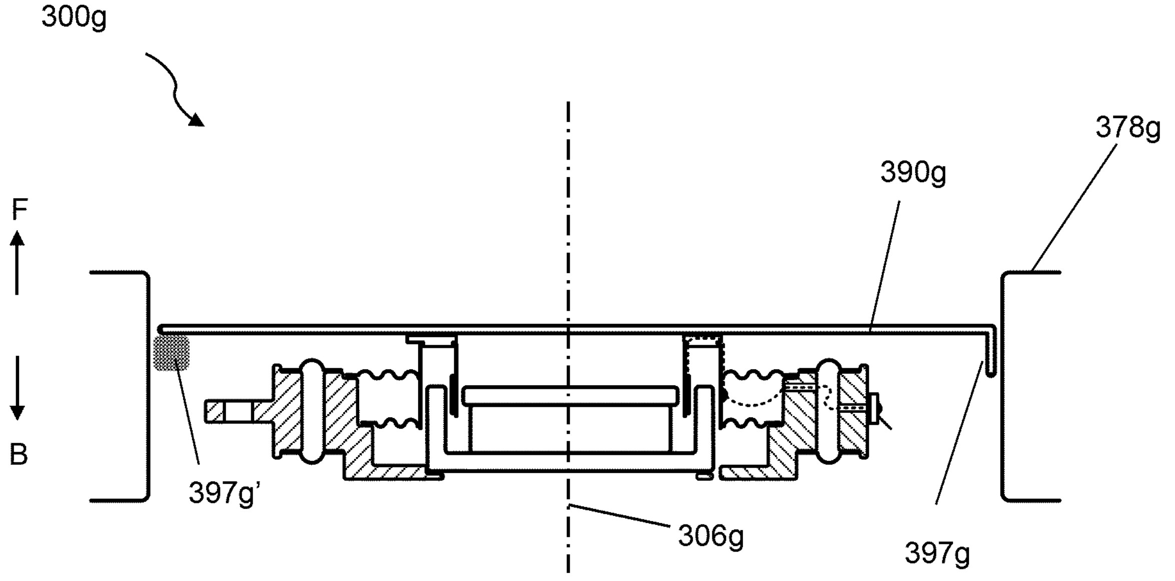
Figure 6H:
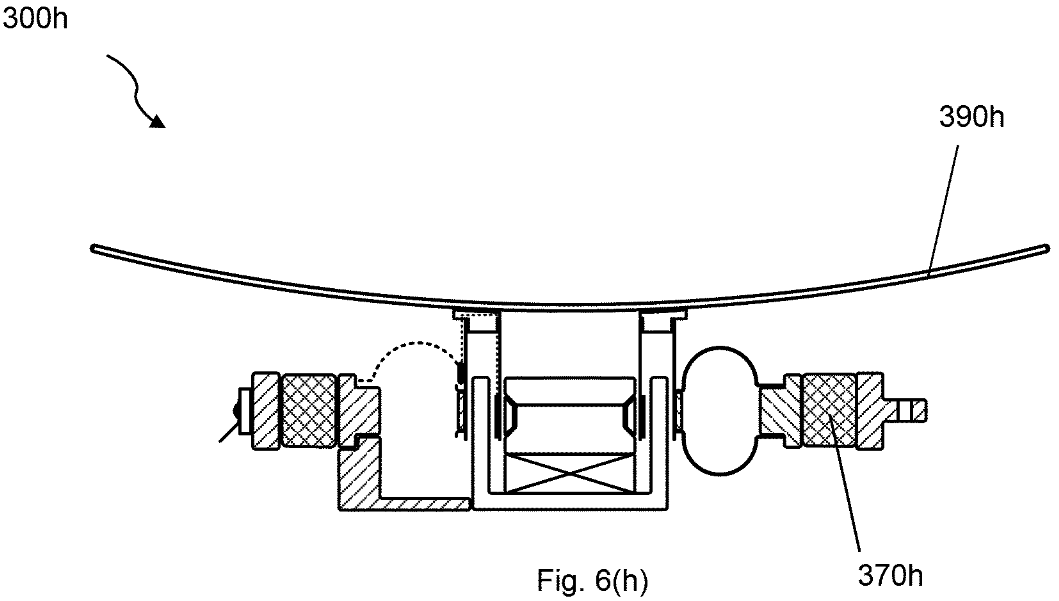
Figure 6I:
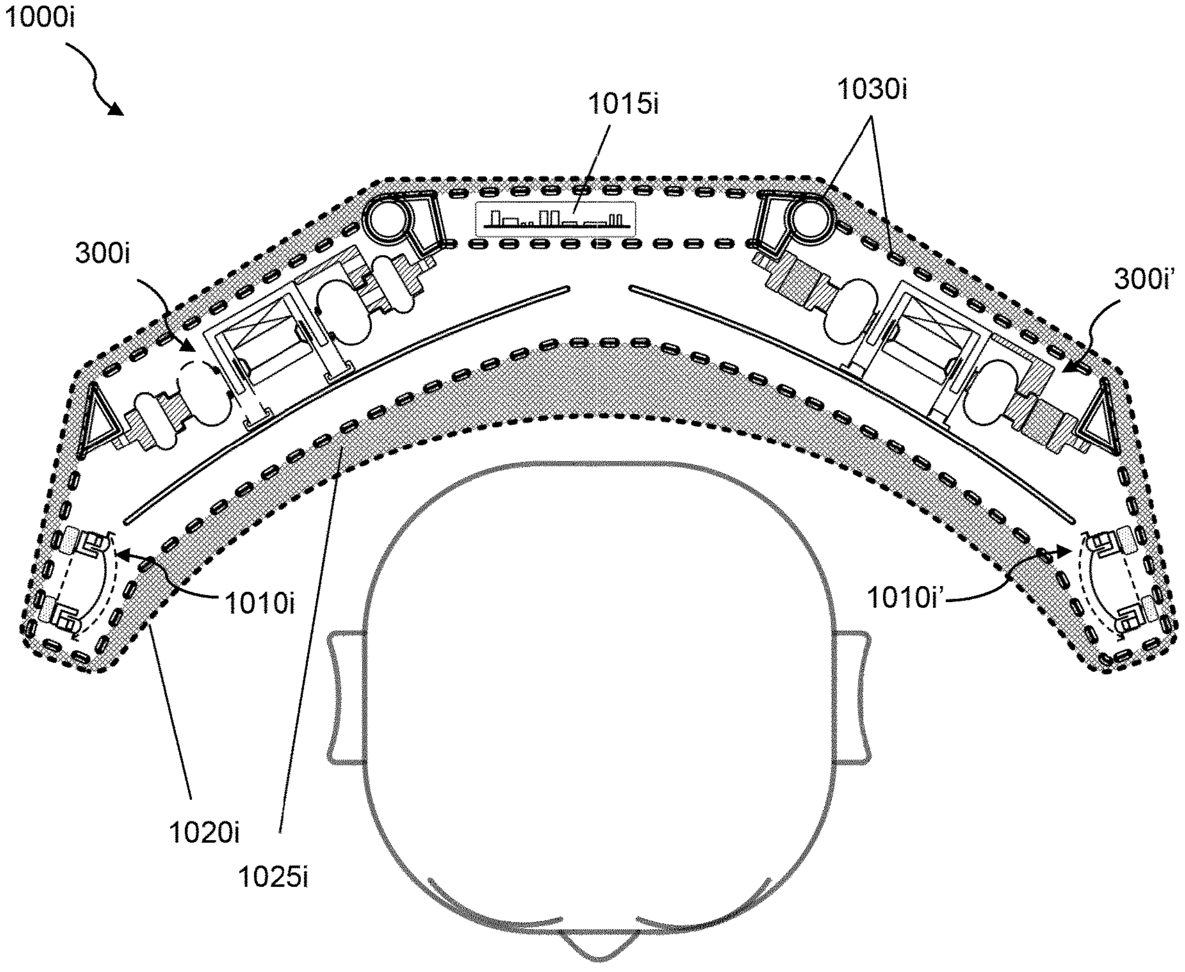

FIG. 6(*a*) shows a first example loudspeaker 300*a*, in which there is an acoustic radiator 390*a* attached to the coil assembly 304*a*, wherein the attachment portion 350*a* provides the attachment between the coil assembly 304*a* and the acoustic radiator 390*a*.

As shown in FIG. 6(*a*), the loudspeaker 300*a* additionally includes a mounting frame 380*a*, wherein the magnet unit assembly 302*a* is suspended from the mounting frame 380*a* by at least one mounting frame suspension 370*a*, 375*a*. In this example, the magnet unit assembly is suspended from the mounting frame by two mounting frame suspensions 370*a*, 375*a*, which are in this example both roll suspensions, wherein the single corrugations mirror each other (in a plane perpendicular to the movement axis) to help cancel asymmetries in stiffness between the two mounting frame suspensions 370*a*, 375*a*.

In this example, the mounting frame 380*a* is configured to fixedly (i.e. rigidly) attach to a rigid supporting structure, such as a car seat frame, by including one or more mounting formations. In this example, the mounting formations are holes 392*a*, through which bolts can pass in order to bolt the mounting frame 380*a* to the rigid supporting structure.

To facilitate the use of the bolt, the acoustic radiator 390*a* may include one or more access holes 392*a* to configured to provide access to the one or more mounting formations. The one or more access holes 392*a* may be closed with tape 393*a* after access is no longer needed, so as to reduce/avoid loss of acoustic performance due to the presence of the one or more access holes. Other acoustic radiator constructions are of course possible.

As shown in FIG. 6(*a*), the acoustic radiator 390*a* has a width in a direction d perpendicular to the movement axis 306*a* that is larger than a width of the drive unit 301*a* in the same direction. In other words, the acoustic radiator 390*a* extends beyond the sides of the drive unit 301*a* in at least one direction (d) perpendicular to the movement axis.

The acoustic radiator 390*a* has: a first radiating surface 394*a* which faces in a forward direction F, away from the drive unit 301*a*; and a second radiating surface 394*a*' which faces in a backward direction B, toward the drive unit; wherein the coil assembly 304*a* of the drive unit 301*a* is attached to the second radiating surface 394*a*' of the acoustic radiator (via the attachment portion 350*a*).

FIG. 6(*b*) shows a second example loudspeaker 300*b*, wherein the acoustic radiator has been omitted, for clarity.

In this example, the loudspeaker 300*b* includes:

- a first mounting frame suspension 360*b* and a first drive unit suspension 370*b* that are both part of a first piece of material (which may be an elastic material, in some examples); and
- a second mounting frame suspension 365*b* and a second drive unit suspension 375*b* that are both part of a second piece of material (which may be an elastic material, in some examples).

The magnet unit 310*b* in this case includes a two-pole piece with a recession 317*b* at the voice coil location. This recession 317*b* can be filled, e.g. with copper.

The first and/or second drive unit suspension 360*b*, 365*b* may include one or more holes/interruptions to help silence its operation. In this particular example, the first drive unit suspension 360*b* is perforated to achieve this effect.

FIG. 6(*c*) shows a third example loudspeaker 300*c*.

In this example, the acoustic radiator is curved 390*c* so that the first radiating surface 394*c* is concave and so that the second radiating surface 394*c*' is convex.

The first and/or second drive unit suspension may include one or more interruptions to help facilitate the attachment of a lead wire 334*c*. In this particular example, the second drive unit suspension 365*c* include an interruption through which the lead wire 334*c* passes.

Again, the acoustic radiator 390*c* has a width in a direction d perpendicular to the movement axis that is larger than a width of the drive unit 301*c* in the same direction.

FIGS. 6(*d*)(*i*)-(*iii*) show a fourth example loudspeaker 300*d*.

In this example, the acoustic radiator 390*d* is curved so that the first radiating surface 394*d* is concave and so that its second radiating surface 394*d*' is convex.

Again, the acoustic radiator 390*d* has a width in a direction d perpendicular to the movement axis that is larger than a width of the drive unit 301*d* in the same direction.

The attachment portion 350*d* is attached to the acoustic radiator 390*d* at multiple locations on the acoustic radiator 390*d*, wherein a centre of mass of the acoustic radiator 390*d* is located between two of the locations at which the attachment portion 350*d* is attached to the acoustic radiator, preferably such that the acoustic radiator is driven (substantially) at its centre of mass. In this example, the centre of mass is located on the movement axis 306*d*, and is therefore between the two locations at which the attachment portion 350*d* is attached to the acoustic radiator 390*d* in the plane of cross-section depicted in FIG. 6(*d*)(*iii*) (these two locations correspond to the two points labelled by reference numeral 350*d* in FIG. 6(*d*)(*iii*)).

In this example, the drive unit suspensions 360*d*, 365*d* each extend in a linear direction in a plane perpendicular to the movement axis, e.g. for increased linearity of movement, for silent operation and/or for avoiding trapped air that can make blowing noises. Interruptions in the drive unit suspensions 360*d*, 365*d* are provided by gaps between the linear suspensions.

FIGS. 6(*e*)(*i*)-(*ii*) show a fifth example loudspeaker 300*e*, wherein FIG. 6(*e*)(*i*) is a view of the front (forward-facing) surface of the loudspeaker 300*e*, and FIG. 6(*e*)(*ii*) is a view of the back (backward-facing) surface of the loudspeaker 300*e*.

In this example, the loudspeaker 300*e* shares many of the features of the example loudspeaker shown in FIG. 6(*b*), but in this case the acoustic radiator 390*e* has a laminate structure formed of three layers: a layer of polystyrene 395*e* sandwiched between two layers of balsa 395*e*', 395", wherein a first layer of balsa 395*e*' is attached to a first (forward-facing) face of the layer of polystyrene 395*e*, and a second (backward-facing) layer of balsa 395*e*' is attached to a second face of the layer of polystyrene 395*e*.

The first layer of balsa 395*e*' covers less than 75% or less of the surface area of the face of the layer of polystyrene 395*e* to which the first layer of balsa 395*e*' is attached, The first layer of balsa 395*e*' and the part of the face of the layer of polystyrene 395*e* exposed behind the first layer of balsa 395*e*' provides a first radiating surface 394*e* of the acoustic radiator 390*e*.

The second layer of balsa 395*e*" covers less than 75% or less of the surface area of the face of the layer of polystyrene 395*e* to which the second layer of balsa 395*e*" is attached, The second layer of balsa 395*e*" and the part of the face of the layer of polystyrene 395*e* exposed behind the second layer of balsa 395*e*" provides a second radiating surface 394*e*' of the acoustic radiator 390*e*.

The first and second layers of balsa 395*e*', 395*e*" help to stiffen the acoustic radiator 390*e*.

The polystyrene in the layer of polystyrene 395*e* is preferably expanded, but could be extruded instead. Example parameters for the layer of polystyrene 395*e* may be:

- Density: as low as possible e.g. 15 kg/m$^3$ up to 60 kg/m$^3$
- E modulus (which is related to density) may be in the range 1.4 MPa-4.0 MPa
- Thickness may be up to 10 mm, preferably 3 mm to 5 mm.

The balsa in the layers of balsa 395*e*', 395*e*" may be a sheet of balsa wood, or a balsa veneer. If a sheet of balsa is used, then a grain direction of the balsa preferably extends in a direction in which the balsa is longest. Example parameters for each layer of balsa 395*e*', 395*e*" may be:

- Density: 100 kg/m$^3$ to 150 kg/$^3$
- Bending modulus along the grain may be 3.5 GPa-5 GPa (note that bending modulus rises with frequency)
- Thickness may be 0.5 mm-1.5 mm Note that each layer of balsa 395*e*', 395*e*" covers only part of a surface formed from the layer of polystyrene 395*e*, e.g. so that only the minimum amount of balsa is used to achieve a desired stiffness.

FIG. 6(*f*) shows a sixth example loudspeaker 300*f*.

In this example, the acoustic radiator 390*f* has a laminate structure formed of at least two layers wherein the at least two layers include a first layer of a first material having a first density, and a second layer of a second material having a second density, wherein the first density is lower than the second density. In some examples, there may be an additional third layer of the second material, wherein the first layer is sandwiched between the second layer of the second material and the third layer of the second material having the second density. The at first and second materials may be, for example:

- balsa-foam
- paper-foam
- paper-honeycomb
- carbon fibre-foam
- glass fibre-paper A laminate structure including two layers of the same material are also possible, e.g. balsa-balsa.

In this example, the attachment portion 350*f* of the drive unit 301*f* includes alignment features configured to engage with corresponding alignment features 391*f* (here drawn as shoes) on the acoustic radiator 390*f* to facilitate alignment and easy attachment of the attachment portion 350*f* and acoustic radiator 390*f*. This attachment may be mechanical (e.g. screw, bayonet or heat weld) or chemical (adhesive).

This example shows two alternative forms of crash protection (circled with dotted lines), i.e. two locations at which a frame of the magnet assembly 302*f* and the mounting frame 380*f* overlap as viewed in a plane (e.g. plane 308*f*) perpendicular to the movement axis 306*f*. These crash protection features help to prevent the magnet assembly 302*f* from protruding out from a headrest during a crash of a vehicle in which the loudspeaker 300*f* is mounted within the headrest.

Of course, it would be possible to have just one of the crash protection features as shown in FIG. 6(*f*), rather than both. It would equally be possible for either/both of these crash protection features to be present continuously (or discontinuously) along a path extending around the movement axis.

FIG. 6(*g*) shows a seventh example loudspeaker 300*g*.

In this example, the acoustic radiator 390*g* has, at its periphery (outer edge), an extension which extends along the movement axis in the backward direction B.

For the purposes of demonstrating different solutions, FIG. 6(*g*) shows two possible forms of the extension.

In a first form, the extension 397*g* is an integral part of the acoustic radiator which is folded to extend along the movement axis in the backward direction.

In a second form, the extension is provided by a foam strip 397*g*' attached (e.g. by adhesive) to the remainder of the acoustic radiator 390*g* at the periphery of the acoustic radiator 390*g*.

A seat (e.g. part of a seat headrest in which the loudspeaker is mounted) may include a waveguide 378*g* which at least partially (preferably entirely) surrounds the acoustic radiator 390*g* and is configured to guide sound produced by the first and/or second radiating surface of the acoustic radiator 390*g*.

Preferably, a gap between the waveguide and a periphery of the acoustic radiator 390*g* less than 5 mm, more preferably less than 2 mm (e.g. in the range 1 mm to 2 mm), at one or more (preferably all) locations at the periphery of the acoustic radiator.

FIG. 6(*h*) shows an eighth example loudspeaker 300*h*.

In this example, there is only one mounting frame suspension 370*h*, wherein this mounting frame suspension 370*h* is formed of elastic foam, preferably a single piece of elastic foam, e.g. which may have properties as described in [15], though other forms of elastic foam are of course possible.

FIG. 6(*i*) shows a seat headrest 1000*i* incorporating ninth and tenth loudspeakers 300*i*, 300*i*', and additionally incorporating two mid-high frequency loudspeakers 1010*i*, 1010*i*'.

The two mid-high frequency loudspeakers 1010*i*, 1010*i*' may be of a cardioid type, e.g. as described in [16], though other forms of mid-high frequency loudspeakers are of course possible.

Also shown in FIG. 6(*i*) are:

an electronic unit 1015*i* headrest chassis 1030*i* to which the mounting frame 380*i* of the loudspeaker 300*i* is attached (the headrest chassis 1030*i* is part of a rigid seat frame)

acoustic transparent finishing material 1020*i*, e.g. perforated leather, textile, etc (noting that parts can be left non transparent for aesthetic reasons)

Open cell elastic foam 1025*i*, preferably acoustic transparent in front of the acoustic radiators 300*i*, 300*i*' (this can be combined with areas of non-transparent foam to increase support comfort)

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventor does not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

[1] U.S. Pat. No. 6,618,487B1
[2] U.S. Pat. No. 4,506,117A
[3] U.S. Pat. No. 8,247,930B2
[4] U.S. Pat. No. 7,372,968B2
[5] U.S. Pat. No. 4,550,428A
[6] U.S. Pat. No. 6,965,679B1
[7] US2005/180587A1
[8] U.S. Pat. No. 4,675,907A
[9] U.S. Pat. No. 4,354,067A
[10] U.S. Pat. No. 4,750,208A
[11] DE102004009902A1
[12] U.S. Pat. No. 9,621,994B1
[13] U.S. Pat. No. 5,734,132

[14] WO2019/121266
[15] GB2008724.3
[16] GB2004076.2

The invention claimed is:

1. A loudspeaker comprising:
a mounting frame;
an acoustic radiator;
a drive unit, including:
a magnet assembly including a magnet unit configured to provide a magnetic field in an air gap, wherein the air gap extends around a movement axis of the drive unit; and
a coil assembly including:
an attachment portion which provides an attachment between the coil assembly and the acoustic radiator;
a voice coil;
a voice coil former which extends from the attachment portion into the air gap, wherein the voice coil is mounted to the voice coil former so that the voice coil sits in the air gap when the drive unit is at rest; and
a tubular member, which is positioned radially outwardly of the voice coil former with respect to the movement axis, and which overlaps the voice coil former along at least a portion of the movement axis; and
at least one drive unit suspension attached to the tubular member and a part of the magnet assembly positioned radially outwardly of the tubular member so that the acoustic radiator is suspended from the magnet assembly via the coil assembly by the at least one drive unit suspension;
wherein the magnet assembly is suspended from the mounting frame by at least one mounting frame suspension.

2. A loudspeaker according to claim 1, wherein the drive unit comprises:
a first suspension attached to the tubular member and the part of the magnet assembly positioned radially outwardly of the tubular member; and
a second suspension, separated from the first suspension in a direction extending parallel to the movement axis, wherein the second suspension is either: attached to the tubular member and the part of the magnet assembly positioned radially outwardly of the tubular member or is attached to the voice coil former and a part of the magnet assembly positioned radially inwardly of the voice coil former.

3. A loudspeaker according to claim 2, wherein:
the first suspension is attached to a distal portion of the tubular member and a distal portion of the part of the magnet assembly positioned radially outwardly of the tubular member.

4. A loudspeaker according to claim 3, wherein:
the second suspension is attached to a proximal portion of the tubular member and a proximal portion of the part of the magnet assembly positioned radially outwardly of the tubular member.

5. A loudspeaker according to claim 1, wherein the magnet assembly includes a magnet assembly frame to which the magnet unit is attached, wherein the part of the magnet assembly positioned radially outwardly of the tubular member is a part of the magnet assembly frame.

6. A loudspeaker according to claim 1, wherein:
the tubular member is shaped to include the attachment portion, and optionally the voice coil former; and/or
the tubular member has one or more extensions in a radial direction with respect to the movement axis to provide a respective attachment surface for the/each suspension attached to the tubular member, thereby facilitating attachment of the/each suspension to the tubular member.

7. A loudspeaker according to claim 1, wherein:
the attachment portion is a coupling element which is separately attached to the voice coil former and/or tubular member; and/or
the attachment portion is configured to provide an attachment between the coil assembly and the acoustic radiator by including bayonet features configured to engage with corresponding bayonet features on the acoustic radiator to provide a bayonet attachment between the attachment portion and the acoustic radiator.

8. A loudspeaker according to claim 1, wherein the drive unit includes one or more wires configured to provide an electrical path for supplying an electrical current carrying an audio signal to the voice coil, wherein:
the electrical path provided by the one or more wires extends from a connector formed on the magnet assembly to the voice coil; and/or
the one or more wires include a wire that passes through or around the tubular member, wherein optionally a coupling element is configured to guide said wire through or around the tubular member; and/or
the one or more wires includes a wire that passes through a frame included in the magnet assembly.

9. A loudspeaker according to claim 1, wherein the at least one mounting frame suspension is tuned to have a resonance frequency in the range 10 Hz to 20 Hz.

10. A loudspeaker according to claim 1, wherein the loudspeaker includes:
a first mounting frame suspension and a first drive unit suspension that are both part of a first piece of material; and, optionally
a second mounting frame suspension and a second drive unit suspension that are both part of a second piece of material.

11. A loudspeaker according to claim 1, wherein the acoustic radiator has a width in at least one direction perpendicular to the movement axis that is larger than a width of the drive unit in the same direction.

12. A loudspeaker according to claim 1, wherein:
the acoustic radiator has a laminate structure formed of at least two layers, wherein the at least two layers include a first layer of a first material having a first density, and a second layer of a second material having a second density, wherein the first density is lower than the second density; and/or
the acoustic radiator has a laminate structure formed of at least three layers, wherein the at least three layers include a first layer of a first material having a first density, wherein the first layer is sandwiched between a second layer of a second material having a second density, and a third layer of a third material having a third density, wherein the first density is lower than both the second density and third density.

13. A loudspeaker according to claim 12, wherein the second layer covers 75% or less of the surface area of the face of the first layer to which the second layer is attached and, optionally, the third layer covers 75% or less of the surface area of the face of the first layer to which the third layer is attached.

14. A loudspeaker according to claim 1, wherein:
the acoustic radiator has:

a first radiating surface which faces in a forward direction, away from the drive unit; and a second radiating surface which faces in a backward direction, toward the drive unit;

the coil assembly of the drive unit is attached to the second radiating surface of the acoustic radiator;

the acoustic radiator is curved so that the first radiating surface is concave and so that the second radiating surface is convex.

15. A loudspeaker according to claim 1, wherein the loudspeaker is a subwoofer configured as a dipole loudspeaker.

16. A loudspeaker according to claim 1, wherein a frame of the magnet assembly and the mounting frame overlap at one or more locations as viewed in a plane perpendicular to the movement axis.

17. A loudspeaker comprising:

a mounting frame;

an acoustic radiator;

a drive unit, including:

a magnet assembly including a magnet unit configured to provide a magnetic field in an air gap, wherein the air gap extends around a movement axis of the drive unit; and a coil assembly including:

an attachment portion which provides an attachment between the coil assembly and the acoustic radiator;

a voice coil;

a voice coil former which extends from the attachment portion into the air gap, wherein the voice coil is mounted to the voice coil former so that the voice coil sits in the air gap when the drive unit is at rest; and a tubular member, which is positioned radially inwardly of the voice coil former with respect to the movement axis, and which overlaps the voice coil former along at least a portion of the movement axis; and at least one drive unit suspension attached to the tubular member and a part of the magnet assembly positioned radially inwardly of the tubular member so that the acoustic radiator is suspended from the magnet assembly via the coil assembly by the at least one drive unit suspension;

wherein the magnet assembly is suspended from the mounting frame by at least one mounting frame suspension.

18. A loudspeaker according to claim 17, wherein the drive unit comprises:

a first suspension attached to the tubular member and the part of the magnet assembly positioned radially inwardly of the tubular member; and a second suspension, separated from the first suspension in a direction extending parallel to the movement axis, wherein the second suspension is either: attached to the tubular member and the part of the magnet assembly positioned radially inwardly of the tubular member or is attached to the voice coil former and a part of the magnet assembly positioned radially outwardly of the voice coil former;

wherein the first suspension is attached to a distal portion of the tubular member and a distal portion of the part of the magnet assembly positioned radially inwardly of the tubular member;

wherein the second suspension is attached to a proximal portion of the tubular member and a proximal portion of the part of the magnet assembly positioned radially inwardly of the tubular member;

wherein the magnet assembly includes a magnet assembly frame to which the magnet unit is attached, wherein the part of the magnet assembly positioned radially inwardly of the tubular member is a part of the magnet assembly frame.

19. A seat assembly including:

a seat; and a loudspeaker;

wherein the loudspeaker comprises:

a mounting frame;

an acoustic radiator;

a drive unit, including:

a magnet assembly including a magnet unit configured to provide a magnetic field in an air gap, wherein the air gap extends around a movement axis of the drive unit; and a coil assembly including:

an attachment portion which provides an attachment between the coil assembly and the acoustic radiator;

a voice coil;

a voice coil former which extends from the attachment portion into the air gap, wherein the voice coil is mounted to the voice coil former so that the voice coil sits in the air gap when the drive unit is at rest; and a tubular member, which is positioned radially outwardly of the voice coil former with respect to the movement axis, and which overlaps the voice coil former along at least a portion of the movement axis; and at least one drive unit suspension attached to the tubular member and a part of the magnet assembly positioned radially outwardly of the tubular member so that the acoustic radiator is suspended from the magnet assembly via the coil assembly by the at least one drive unit suspension;

wherein the magnet assembly is suspended from the mounting frame by at least one mounting frame suspension;

wherein the seat is configured to position a user who is sat down in the seat such that each ear of a user is located at a respective listening position that is 25 cm or less, more preferably 20 cm or less from a first radiating surface of the loudspeaker, wherein the loudspeaker may be mounted within a headrest of the seat.

20. A seat assembly according to claim 19, wherein the seat includes a waveguide which at least partially surrounds the acoustic radiator and is configured to guide sound produced by the first and/or second radiating surface of the acoustic radiator, wherein a gap between the waveguide and a periphery of the acoustic radiator is less than 5 mm at one or more locations at the periphery of the acoustic radiator.

* * * * *